(12) United States Patent
Srivastava et al.

(10) Patent No.: US 12,554,559 B2
(45) Date of Patent: Feb. 17, 2026

(54) CLASSIFICATION OF EVENTS BY PATTERN RECOGNITION IN MULTIVARIATE TIME SERIES DATA

(71) Applicant: Honeywell International Inc., Charlotte, NC (US)

(72) Inventors: Viraj Srivastava, New Delhi (IN); Praveen Tayal, Hyderabad (IN); Puneet Sharma, Bangalore (IN); Lingathurai Palanisamy, Bangalore (IN); Minal Nitin Dani, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 581 days.

(21) Appl. No.: 18/058,050

(22) Filed: Nov. 22, 2022

(65) Prior Publication Data

US 2023/0161645 A1 May 25, 2023

Related U.S. Application Data

(60) Provisional application No. 63/282,917, filed on Nov. 24, 2021.

(51) Int. Cl.
*G06F 9/54* (2006.01)
*G06F 18/241* (2023.01)

(52) U.S. Cl.
CPC ............ *G06F 9/542* (2013.01); *G06F 18/241* (2023.01)

(58) Field of Classification Search
CPC ... G06F 9/542; G06F 18/241; G06V 10/7635; G06V 20/20
See application file for complete search history.

(56) References Cited

U.S. PATENT DOCUMENTS

| | | | | |
|---|---|---|---|---|
| 2003/0210266 A1* | 11/2003 | Cragun | ................... | G06F 9/451 715/762 |
| 2004/0186927 A1* | 9/2004 | Eryurek | ............. | G05B 23/0278 710/13 |
| 2005/0222879 A1* | 10/2005 | Dumas | ................... | G06Q 10/04 705/5 |
| 2005/0267702 A1* | 12/2005 | Shah | ................... | G05B 23/0229 702/81 |
| 2007/0112733 A1* | 5/2007 | Beyer | ..................... | G06Q 30/02 |
| 2008/0040808 A1* | 2/2008 | Tokie | ..................... | G06F 21/645 726/26 |
| 2009/0012723 A1* | 1/2009 | Treado | ................... | G16C 20/20 702/22 |

(Continued)

*Primary Examiner* — Tuan C Dao
(74) *Attorney, Agent, or Firm* — Alston & Bird LLP

(57) ABSTRACT

Various embodiments described herein relate to classification of events by pattern recognition in multivariate time series data associated with one or more assets. In this regard, a request to classify events associated with one or more assets is received. The request includes an asset descriptor describing the one or more assets. In response to the request, aggregated multivariate data associated with the one or more assets is obtained based on the asset descriptor. Furthermore, one or more events associated with the aggregated multivariate data is labeled based respective defined data signatures for respective defined events associated with a defined event attribute. A dashboard visualization is then provided to an electronic interface of a computing device. The dashboard visualization includes data associated with the one or more events.

20 Claims, 12 Drawing Sheets

(56) References Cited

U.S. PATENT DOCUMENTS

| | | | | |
|---|---|---|---|---|
| 2011/0246402 A1* | 10/2011 | Burman | ............ | G08B 13/1672 |
| | | | | 706/14 |
| 2015/0348591 A1* | 12/2015 | Kaps | ...................... | G11B 27/17 |
| | | | | 386/201 |
| 2017/0091320 A1* | 3/2017 | Psota | ................... | G06F 16/3337 |
| 2018/0321356 A1* | 11/2018 | Kulkarni | ............. | H04W 64/003 |
| 2018/0356800 A1* | 12/2018 | Chao | ........................ | G06F 16/10 |
| 2019/0108404 A1* | 4/2019 | Xu | ................... | G08B 13/19604 |
| 2020/0162489 A1* | 5/2020 | Bar-Nahum | ............. | G08G 5/55 |
| 2020/0272606 A1* | 8/2020 | Leonov | .................... | G06F 40/30 |
| 2021/0121090 A1* | 4/2021 | Weinstein | .............. | A61B 5/257 |
| 2021/0243226 A1* | 8/2021 | El Gamal | ........... | H04L 63/1416 |
| 2021/0382473 A1* | 12/2021 | Stano | ................. | G05B 23/0283 |

\* cited by examiner

CLASSIFICATION OF EVENTS BY PATTERN RECOGNITION IN MULTIVARIATE TIME SERIES DATA

CROSS REFERENCE TO RELATED APPLICATIONS

This application claims the benefit of U.S. Provisional Patent Application No. 63/282,917, titled "CLASSIFICATION OF EVENTS BY PATTERN RECOGNITION IN MULTIVARIATE TIME SERIES DATA," and filed on Nov. 24, 2021, the entirety of which is hereby incorporated by reference.

TECHNICAL FIELD

The present disclosure relates generally to real-time asset analytics, and more particularly to classification of events by pattern recognition in multivariate time series data associated with one or more assets

BACKGROUND

Traditionally, data analytics and/or digital transformation of data related to an industrial environment generally involves human interaction associated with a specialized worker (e.g., via engineering analysis of the data). Furthermore, a limited amount of time is traditionally spent on modeling of data related to an industrial environment to, for example, provide insights related to the data. As such, computing resources related to data analytics and/or digital transformation of data related to an industrial environment are traditionally employed in an inefficient manner.

SUMMARY

The details of some embodiments of the subject matter described in this specification are set forth in the accompanying drawings and the description below. Other features, aspects, and advantages of the subject matter will become apparent from the description, the drawings, and the claims.

In an embodiment, a system comprises one or more processors, a memory, and one or more programs stored in the memory. The one or more programs comprise instructions configured to receive a request to classify events associated with one or more assets. In one or more embodiments, the request comprises an asset descriptor describing the one or more assets. In one or more embodiments, in response to the request, the one or more programs further comprise instructions configured to obtain, based on the asset descriptor, aggregated multivariate data associated with the one or more assets. In one or more embodiments, in response to the request, the one or more programs further comprise instructions to determine a data signature for at least a portion of the aggregated multivariate data that corresponds to sensor output of the one or more assets. In one or more embodiments, in response to the request, the one or more programs further comprise instructions to determine, based on respective defined data signatures for respective defined events associated with a defined event attribute, a respective label for one or more events associated with the data signature. In one or more embodiments, in response to the request, the one or more programs further comprise instructions to provide a dashboard visualization to an electronic interface of a computing device, the dashboard visualization comprising data associated with the one or more events.

In another embodiment, a method comprises, at a device with one or more processors and a memory, receiving a request to classify events associated with one or more assets. In one or more embodiments, the request comprises an asset descriptor describing the one or more assets. In one or more embodiments, the method further comprises, at the device and in response to the request, obtaining, based on the asset descriptor, aggregated multivariate data associated with the one or more assets. In one or more embodiments, the method further comprises, at the device and in response to the request, determining a data signature for at least a portion of the aggregated multivariate data that corresponds to sensor output of the one or more assets. In one or more embodiments, the method further comprises, at the device and in response to the request, determining, based on respective defined data signatures for respective defined events associated with a defined event attribute, a respective label for one or more events associated with the data signature. In one or more embodiments, the method further comprises, at the device and in response to the request, providing a dashboard visualization to an electronic interface of a computing device, the dashboard visualization comprising data associated with the one or more events.

In yet another embodiment, a computer program product comprises at least one computer-readable storage medium having program instructions embodied thereon. The program instructions are executable by a processor to cause the processor to receive a request to classify events associated with one or more assets. In one or more embodiments, the request comprises an asset descriptor describing the one or more assets. In one or more embodiments, in response to the request, the program instructions further cause the processor to obtain, based on the asset descriptor, aggregated multivariate data associated with the one or more assets. In one or more embodiments, in response to the request, the program instructions further cause the processor to determine a data signature for at least a portion of the aggregated multivariate data that corresponds to sensor output of the one or more assets. In one or more embodiments, in response to the request, the program instructions further cause the processor to determine, based on respective defined data signatures for respective defined events associated with a defined event attribute, a respective label for one or more events associated with the data signature. In one or more embodiments, in response to the request, the program instructions further cause the processor to provide a dashboard visualization to an electronic interface of a computing device, the dashboard visualization comprising data associated with the one or more events.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
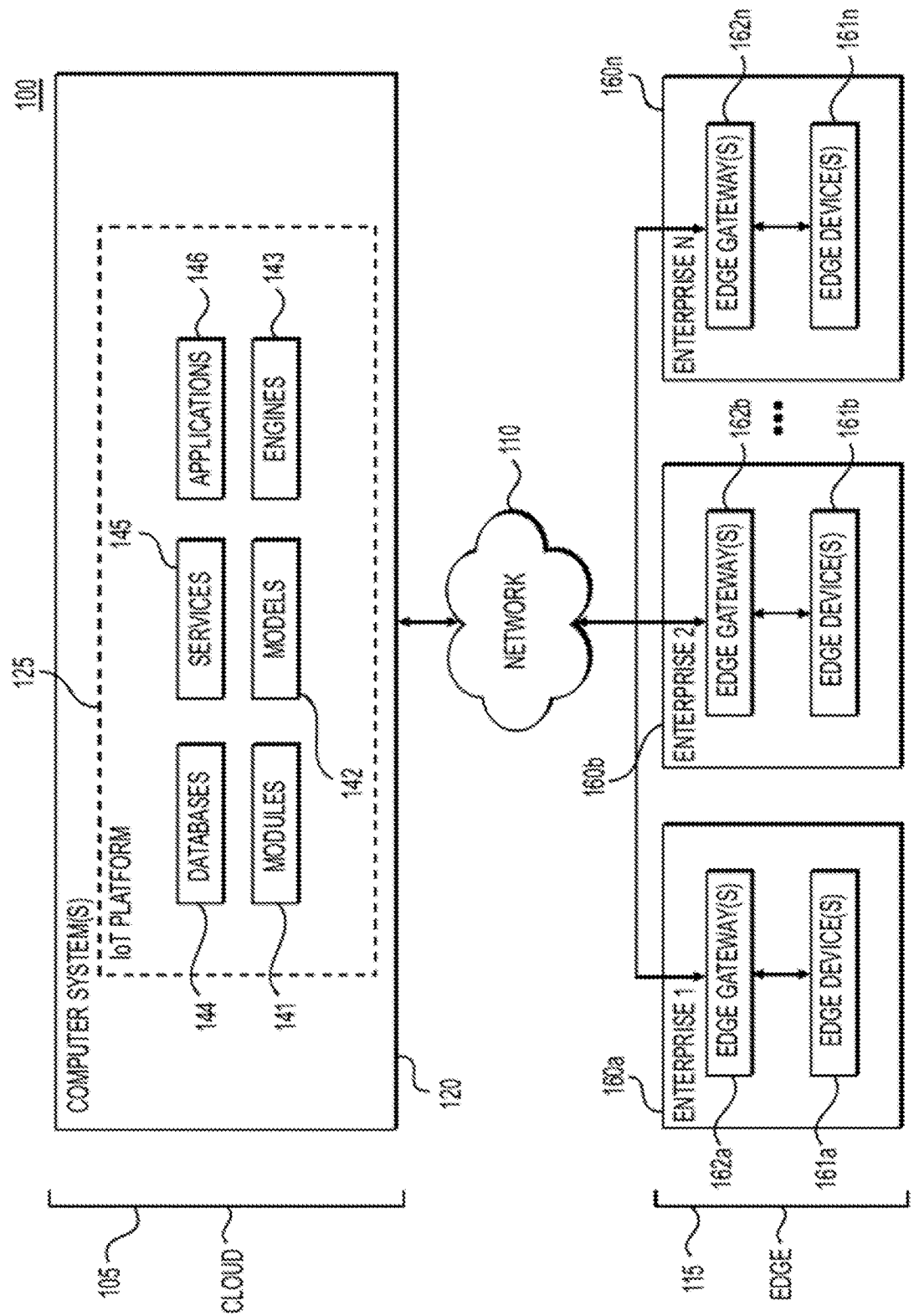
FIG. 1 illustrates an exemplary networked computing system environment, in accordance with one or more embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

Traditionally, data analytics and/or digital transformation of data related to an industrial environment generally involves human interaction associated with a specialized worker (e.g., via engineering analysis of the data). Furthermore, a limited amount of time is traditionally spent on modeling of data related to an industrial environment to, for example, provide insights related to the data. As such, computing resources related to data analytics and/or digital transformation of data related to an industrial environment are traditionally employed in an inefficient manner. Moreover, it is generally difficult to provide data driven automatic labeling of certain events associated with an industrial environment such as, for example, rare events (e.g., large ratio of features to outcome) in multivariate data associated with the industrial environment.

Thus, to address these and/or other issues, classification of events using pattern recognition with respect to multivariate time series data is provided. In various embodiments, the multivariate time series data is associated with one or more assets and/or one or more processes (e.g., one or more assets and/or one or more processes within an industrial environment). In one or more embodiments, data driven automatic labeling of rare events in the multivariate data is provided using data preprocessing, data augmentation, training of machine learning classifiers, candidate data classification using machine learning classifiers, and/or variable trend prediction.

In one or more embodiments, a user interface is provided to label events in historical data (e.g., using a tabular-type user interface), display a list of event periods previously labeled under a particular event label type, display a user label for an event that is different than a predicted label provided by a machine learning classifier for the event, display one or more trends of variables during the event and/or before the event, enable a user to modify an identified event label, enable a user to initiate retraining of a machine learning classifier, and/or display other data associated with classification of events using pattern recognition. In one or more embodiments, the user interface provides a tool to select multiple variables (e.g., tags) that may influence an event, to mark and/or label time periods of interest (e.g., to label rare events), and/or to receive one or more notifications in response to performance criteria associated with one or more assets and/or one or more processes.

In one or more embodiments, classification of events using pattern recognition employs user labels periods of historic data provided via the user interface. Additionally, in one or more embodiments, classification of events using pattern recognition includes training of one or more machine learning classifiers to recognize one or more signatures of data in each period labeled via the user interface, providing real-time streaming data to the classification system during run time, evaluating the real-time streaming data using one or more trained machine learning classifiers to identify presence of one or more predetermined data signatures, generating one or more notification for the user interface in response to a predetermined data signature being identified in the real-time streaming data, displaying one or more metrics of the data signature match via the user interface, configuring the user interface to provide a user an ability to accept the notification or mark the notification as incorrect, configuring the user interface to provide a user an ability to specify a correct label for the data signature match, and/or retraining of one or more machine learning classifiers based on the correct label for the data signature match.

In one or more embodiments, test data (e.g., candidate data) used in an anomaly detection process may be employed as training data for event classification. For example, in one or more embodiments in response to detection of an anomaly, the user interface is configured to allow a user to label the anomaly and/or to invoke an event classification process. In one or more embodiments a data preprocessing module is configured to read training data using one or more data pipelines, clean data (e.g., remove undefined data, remove redundant columns associated with constant data values, etc.), perform feature engineering (e.g., group data into batches of fixed time intervals and/or extract statistical features from respective groups), scale and/or normalize data (e.g., using a min-max scaling technique, etc.), generate data interaction columns (e.g., generate additional columns by multiplying existing columns), remove high correlated feature columns, and/or perform one or more types of preprocessing.

In one or more embodiments, data augmentation is performed to modify one or more data records (e.g., by over sampling, under sampling, and/or generating artificial examples). In one or more embodiments, data augmentation is performed to provide suitable data to train the rare events. In one or more embodiments, one or more data augmentation techniques are selected and/or applied to augment data based on data associated with a predicted rare event and/or rule weighting. In one or more embodiments, a machine learning classifier is trained to detect whether a specific unique event is present in a dataset. In one or more embodiments, training of a machine learning classifier is triggered in response to labeling of an event (e.g., by a user). In one or more embodiments, in response to multiple event labels being added, respective classifier instances are created for the respective event labels. In one or more embodiments, one or more training techniques are selected and/or applied to augment data based on data associated with a predicted rare event and/or rule weighting. In one or more embodiments, a training process includes acquiring one or more hyperparameters for a machine learning classifier, training a machine learning classifier to detect presence or absence of a particular event, storing a machine learning classifier for respective events, calculating a training score for respective machine learning classifiers, and/or displaying training score for respective machine learning classifiers via the user interface. In one or more embodiments, time series data during an event is summarized for each signal and reported via the user interface as a "Step Increase", a "Step Decrease", a "Slope Increase", a "Slope Decrease", or an "Oscillation". In one or more embodiments, variable trend summary for an event is provided by calculating slope, intercept, and/or degree of oscillation for a signal before the event and/or during the event.

In various embodiments, a dashboard visualization across various user identities is provided via a templated dashboard model using, for example, an extensible object model. In various embodiments, metrics associated with a fourth asset hierarchy level (e.g., an asset level) includes events or exception that are related to a target goal. In one or more embodiments, the dashboard visualization allows a user to see how one or more assets are performing against one or more metrics (e.g., one or more KPIs). In one or more embodiments, the dashboard visualization allows a user to identify what next steps with respect to assets will provide an optimal return on investment for the action (e.g., repair device #1 vs. device #2) depending on the metrics (e.g., fixing device #1 will save X % energy, whereas repairing device #2 will save $Y). In one or more embodiments, the dashboard visualization allows a user to view individual assets through the dashboard (e.g., boiler #1 is operating at 90% efficiency, or will fail in X weeks, Y days, Z hours unless action is taken; and repairing the boiler #1 within a first interval of time will save $X, whereas repairing within a second interval of time will save $Y). In one or more embodiments, the dashboard visualization allows a user to change individual settings for an asset remotely. In one or more embodiments, the dashboard visualization notifies a user that changing settings for an asset from X to Y (e.g., in response to prediction of an event) will save X % energy or $Y.

As such, by employing one or more techniques disclosed herein, asset performance and/or process performance is optimized. Additionally, by employing one or more techniques disclosed herein, accuracy of a machine learning classifier is improved. Moreover, by employing one or more techniques disclosed herein, improved insights for opportunity and/or performance insights for assets and/or processes is provided to a user via improved visual indicators associated with a graphical user interface. For instance, by employing one or more techniques disclosed herein, additional and/or improved asset insights as compared to capabilities of conventional techniques can be achieved across a data set. Additionally, performance of a processing system associated with data analytics is improved by employing one or more techniques disclosed herein. For example, a number of computing resources, a number of a storage requirements, and/or number of errors associated with data analytics is reduced by employing one or more techniques disclosed herein.

FIG. 1 illustrates an exemplary networked computing system environment 100, according to the present disclosure. As shown in FIG. 1, networked computing system environment 100 is organized into a plurality of layers including a cloud 105 (e.g., a cloud layer 105), a network 110 (e.g., a network layer 110), and an edge 115 (e.g., an edge layer 115). As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or entity that includes any number of local devices.

Figure 2:
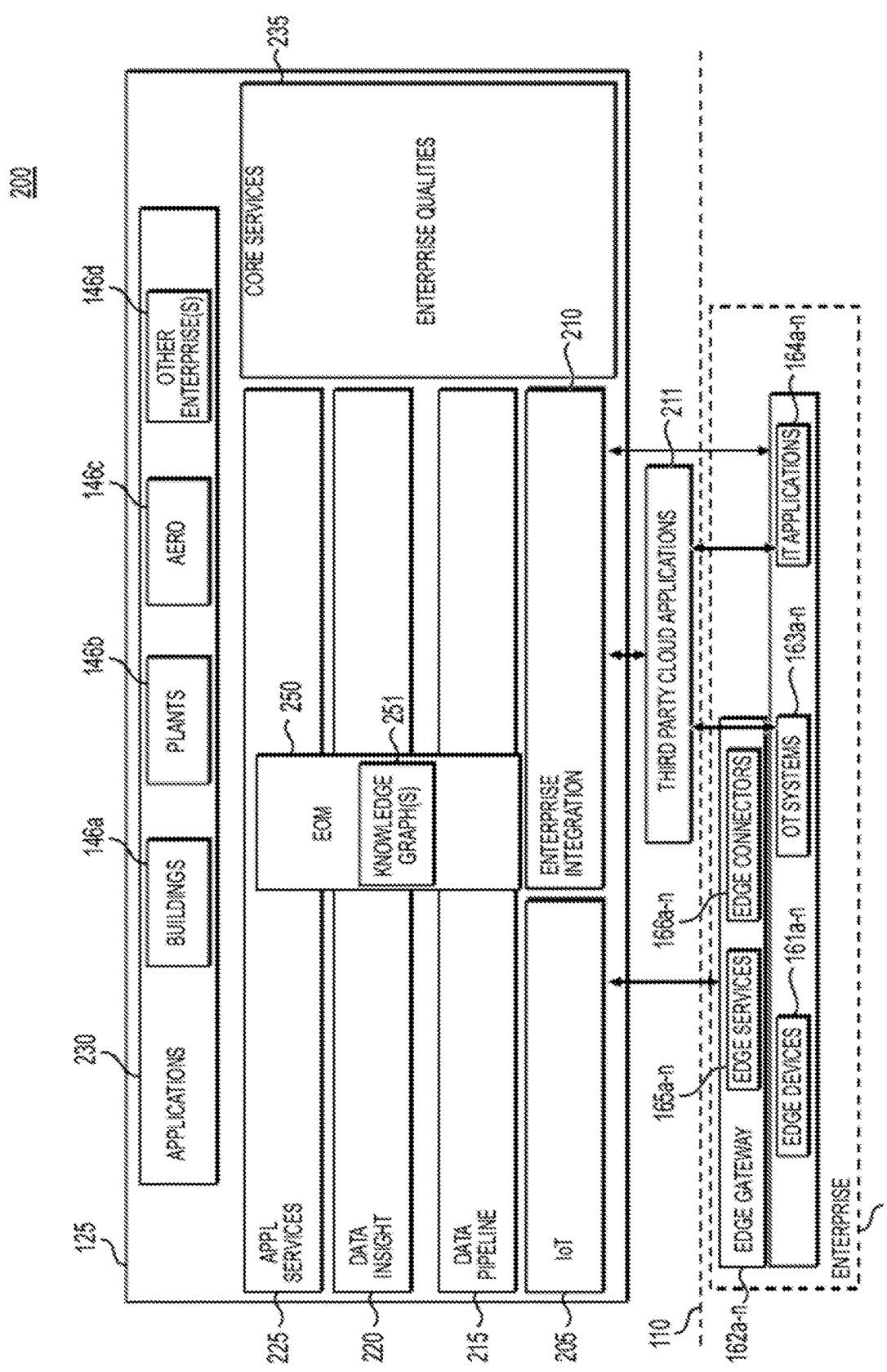
FIG. 2 illustrates a schematic block diagram of a framework of an IoT platform of the networked computing system, in accordance with one or more embodiments described herein.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include assets, sensors, actuators, processors, computers, valves, pumps, ducts, vehicle components, cameras, displays, doors, windows, security components, boilers, chillers, pumps, HVAC components, factory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication medium, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations and/or analytics for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added.

The IoT platform 125 is a model-driven architecture. Thus, the extensible object model 250 communicates with each layer 205-230 to contextualize site data of the enterprise 160a-160n using an extensible graph based object model (or "asset model"). In one or more embodiments, the extensible object model 250 is associated with knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 includes a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161a-161n) and the type of data that is being sensed by each sensor. According to various embodiments, a KPI framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior. In one or more embodiments, each of the key attribute contributing to one or more metrics to drive a dashboard is marked with one or more metric tags such that a dashboard visualization is generated.

The modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161a-161n and determine what the naming conventions refer to. For example, in one or more embodiments, the knowledge graph 251 receives "TMP" during the modeling phase and determine that "TMP" relates to "temperature." The generated models are then published. The complex onboarding process includes the knowledge graph 251 receiving the raw model data, receiving point history data, and receiving site survey data. According to various embodiments, the knowledge graph 251 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, in one or more embodiments, data is ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT layer 205. In some embodiments, only authorized data is sent to the IoT platform 125, and the IoT platform 125 only accepts data from authorized edge gateways 162a-162n and/or edge devices 161a-161n. According to various embodiments, data is sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third-party applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161*a*-161*n*). For example, in an embodiment, a pump template defines pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161*a*-161*n*) instance is created, any associated calculation instances are also created with their input and output parameters linked to the appropriate attributes of the asset (e.g., edge device 161*a*-161*n*).

According to various embodiments, the IoT platform 125 supports a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160*a*-160*n* performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160*a*-160*n* looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about an optimal corrective action to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161*a*-161*n*.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146a-d. The applications layer 230 includes one or more applications 146a-d of the IoT platform 125. For example, according to various embodiments, the applications 146a-d includes a buildings application 146a, a plants application 146b, an aero application 146c, and other enterprise applications 146d. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance and asset health. According to various embodiments, autonomous control includes energy optimization and/or predictive maintenance. As detailed above, according to various embodiments, the general applications 146 is extensible such that each application 146 is configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services 235 include data visualization, data analytics tools, security, scaling, and monitoring. According to various embodiments, the core services 235 also include services for tenant provisioning, single login/common portal, self-service admin, UI library/UI tiles, identity/access/entitlements, logging/monitoring, usage metering, API gateway/dev portal, and the IoT platform 125 streams.

Figure 3:
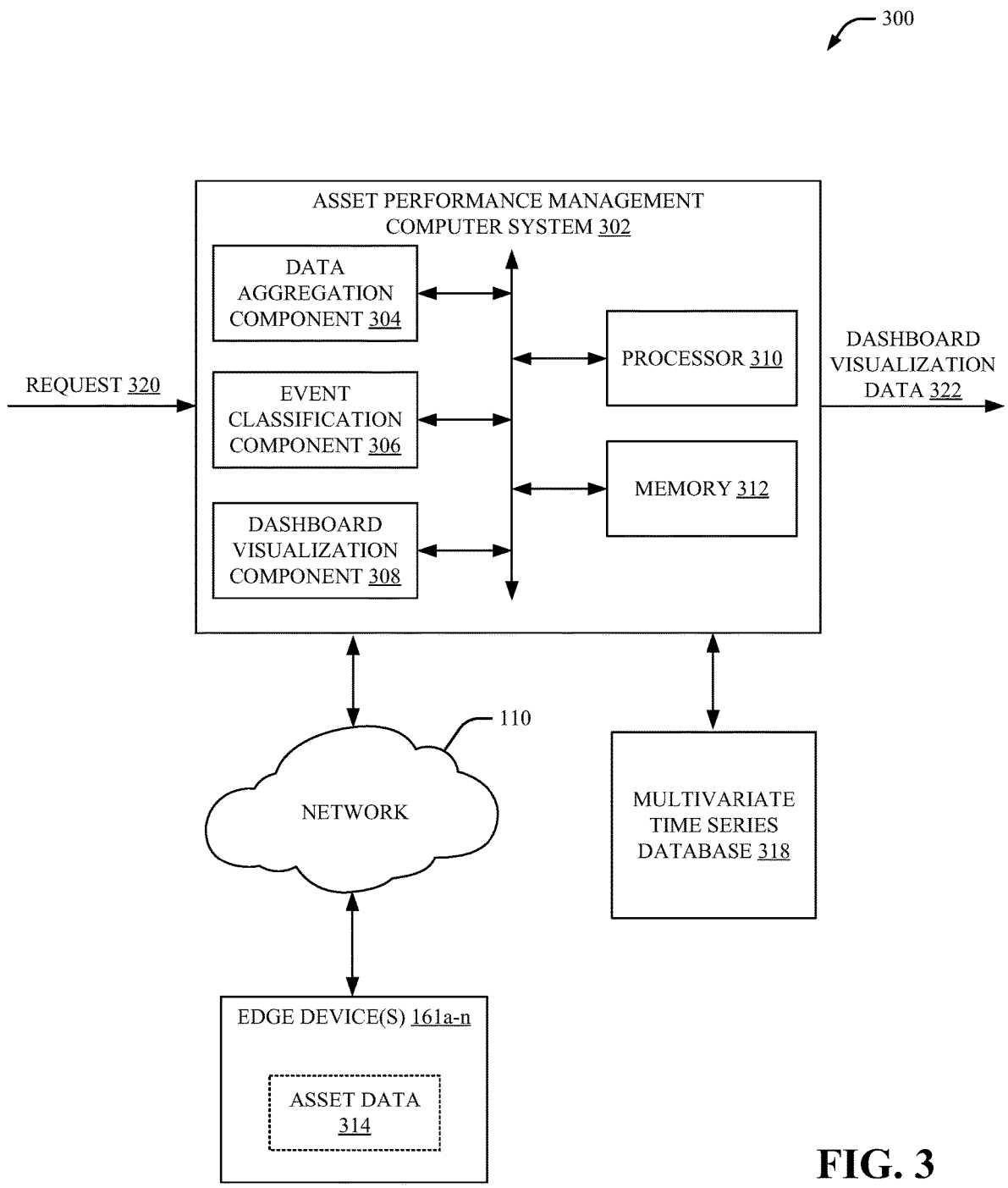
FIG. 3 illustrates a system that provides an exemplary environment, in accordance with one or more embodiments described herein.

FIG. 3 illustrates a system 300 that provides an exemplary environment according to one or more described features of one or more embodiments of the disclosure. According to an embodiment, the system 300 includes an asset performance management computer system 302 to facilitate a practical application of data analytics technology and/or digital transformation technology to provide optimization related to enterprise performance management. In one or more embodiments, the asset performance management computer system 302 facilitates a practical application of classification of events by pattern recognition in multivariate time series data associated with one or more assets and/or one or more asset processes. In one or more embodiments, the asset performance management computer system 302 stores and/or analyzes data that is aggregated from one or more assets and/or one or more data sources associated with an enterprise system (e.g., a building system, an industrial system or another type of enterprise system). Additionally, in one or more embodiments, the asset performance management computer system 302 provides data driven automatic labeling of events in the aggregated data using data preprocessing, data augmentation, and/or machine learning classifiers associated with candidate data classification.

In an embodiment, the asset performance management computer system 302 is a server system (e.g., a server device) that facilitates a data analytics platform between one or more computing devices, one or more data sources, and/or one or more assets. In one or more embodiments, the asset performance management computer system 302 is a device with one or more processors and a memory. In one or more embodiments, the asset performance management computer system 302 is a computer system from the computer systems 120. For example, in one or more embodiments, the asset performance management computer system 302 is implemented via the cloud 105. The asset performance management computer system 302 is also related to one or more technologies, such as, for example, enterprise technologies, connected building technologies, industrial technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies.

Moreover, the asset performance management computer system 302 provides an improvement to one or more technologies such as enterprise technologies, connected building technologies, industrial technologies, IoT technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies. In an implementation, the asset performance management computer system 302 improves performance of a computing device. For example, in one or more embodiments, the asset performance management computer system 302 improves processing efficiency of a computing device (e.g., a server), reduces power consumption of a computing device (e.g., a server), improves quality of data provided by a computing device (e.g., a server), etc.

The asset performance management computer system 302 includes a data aggregation component 304, an event classification component 306 and/or a dashboard visualization component 308. Additionally, in one or more embodiments, the asset performance management computer system 302 includes a processor 310 and/or a memory 312. In certain embodiments, one or more aspects of the asset performance management computer system 302 (and/or other systems, apparatuses and/or processes disclosed herein) constitute executable instructions embodied within a computer-readable storage medium (e.g., the memory 312). For instance, in an embodiment, the memory 312 stores computer executable component and/or executable instructions (e.g., program instructions). Furthermore, the processor 310 facilitates execution of the computer executable components and/or the executable instructions (e.g., the program instructions). In an example embodiment, the processor 310 is configured to execute instructions stored in the memory 312 or otherwise accessible to the processor 310.

The processor 310 is a hardware entity (e.g., physically embodied in circuitry) capable of performing operations according to one or more embodiments of the disclosure. Alternatively, in an embodiment where the processor 310 is embodied as an executor of software instructions, the software instructions configure the processor 310 to perform one or more algorithms and/or operations described herein in response to the software instructions being executed. In an embodiment, the processor 310 is a single core processor, a multi-core processor, multiple processors internal to the asset performance management computer system 302, a remote processor (e.g., a processor implemented on a server), and/or a virtual machine. In certain embodiments, the processor 310 is in communication with the memory 312, the data aggregation component 304, the event classification component 306 and/or the dashboard visualization component 308 via a bus to, for example, facilitate transmission of data among the processor 310, the memory 312, the data aggregation component 304, the event classification component 306 and/or the dashboard visualization component 308. The processor 310 may be embodied in a number of different ways and, in certain embodiments, includes one or more processing devices configured to perform independently. Additionally or alternatively, in one or more embodiments, the processor 310 includes one or more processors configured in tandem via a bus to enable independent execution of instructions, pipelining of data, and/or multi-thread execution of instructions.

The memory 312 is non-transitory and includes, for example, one or more volatile memories and/or one or more non-volatile memories. In other words, in one or more embodiments, the memory 312 is an electronic storage device (e.g., a computer-readable storage medium). The memory 312 is configured to store information, data, content, one or more applications, one or more instructions, or the like, to enable the asset performance management computer system 302 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In an embodiment, the asset performance management computer system 302 (e.g., the data aggregation component 304 of the asset performance management computer system 302) receives asset data 314 from the edge devices 161a-161n. In one or more embodiments, the edge devices 161a-161n are associated with a portfolio of assets. For instance, in one or more embodiments, the edge devices 161a-161n include one or more assets in a portfolio of assets. The edge devices 161a-161n include, in one or more embodiments, one or more databases, one or more assets (e.g., one or more building assets, one or more industrial assets, etc.), one or more IoT devices (e.g., one or more industrial IoT devices), one or more connected building assets, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more boilers, one or more furnaces, one or more heat exchangers, one or more fans, one or more blowers, one or more conveyor belts, one or more vehicle components, one or more cameras, one or more displays, one or more security components, one or more HVAC components, industrial equipment, factory equipment, and/or one or more other devices that are connected to the network 110 for collecting, sending, and/or receiving information. In one or more embodiments, the edge device 161a-161n include, or is otherwise in communication with, one or more controllers for selectively controlling a respective edge device 161a-161n and/or for sending/receiving information between the edge devices 161a-161n and the asset performance management computer system 302 via the network 110. The asset data 314 includes, for example, connected building data, sensor data, real-time data, historical data, event data, process data, asset data, location data, and/or other data associated with the edge devices 161a-161n. In one or more embodiments, at least a portion of the asset data 314 is associated with one or more asset processes associated with the portfolio of assets. For example, in one or more embodiments, at least a portion of the asset data 314 is generated and/or employed by one or more asset processes associated with the portfolio of assets.

In certain embodiments, at least one edge device from the edge devices 161a-161n incorporates encryption capabilities to facilitate encryption of one or more portions of the asset data 314. Additionally, in one or more embodiments, the asset performance management computer system 302 (e.g., the data aggregation component 304 of the asset performance management computer system 302) receives the asset data 314 via the network 110. In one or more embodiments, the network 110 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network. In one or more embodiments, the edge devices 161a-161n are associated with an industrial environment (e.g., a plant, etc.). Additionally or alternatively, in one or more embodiments, the edge devices 161a-161n are associated with components of the edge 115 such as, for example, one or more enterprises 160a-160n.

In one or more embodiments, the data aggregation component 304 aggregates the asset data 314 from the edge devices 161a-161n. For instance, in one or more embodiments, the data aggregation component 304 can aggregate the asset data 314 into a multivariate time series database 318. The multivariate time series database 318 is a cache memory (e.g., a database structure) that dynamically stores the asset data 314 based on interval of time and/or asset hierarchy level. For instance, in one or more embodiments, the multivariate time series database 318 stores the asset data 314 for one or more intervals of time (e.g., 1 minute to 12 minutes, 1 hour to 24 hours, 1 day to 31 days, 1 month to 12 months, etc.) and/or for one or more asset hierarchy levels (e.g., asset level, asset zone, building level, building zone, plant level, plant zone, industrial site level, etc.). In a non-limiting embodiment, the multivariate time series database 318 stores the asset data 314 for a first interval of time (e.g., 1 hour to 24 hours minutes) for a first asset (e.g., a first asset hierarchy level), for a second interval of time (e.g., 1 day to 31 days) for the first asset, and for a third interval of time (e.g., 1 month to 12 months) for the first asset. Furthermore, in the non-limiting embodiment, the multivariate time series database 318 stores the asset data 314 for the first interval of time (e.g., 1 hour to 24 hours minutes) for all assets in a connected building (e.g., a second asset hierarchy level), for the second interval of time (e.g., 1 day to 31 days) for all the assets in the connected building, and for the third interval of time (e.g., 1 month to 12 months) for the all the assets in the connected building. In the non-limiting embodiment, the multivariate time series database 318 also stores the asset data 314 for the first interval of time (e.g., 1 hour to 24 hours minutes) for all connected buildings within a particular geographic region (e.g., a third asset hierarchy level), for the second interval of time (e.g., 1 day to 31 days) for all connected buildings within the particular geographic region, and for the third interval of time (e.g., 1 month to 12 months) for all connected buildings within the particular geographic region. Additionally, in one or more embodiments, the multivariate time series database 318 stores at least a portion of the asset data 314 associated with two or more variables (e.g., two or more features) associated with the portfolio of assets. As such, in one or more embodiments, the multivariate time series database 318 stores multivariate data (e.g., multivariate time series data) associated with the one or more assets (e.g., the edge devices 161a-n)

In one or more embodiments, the data aggregation component 304 repeatedly updates data of the multivariate time series database 318 based on the asset data 314 provided by the edge devices 161a-161n during the one or more intervals of time associated with the multivariate time series database 318. For instance, in one or more embodiments, the data aggregation component 304 stores new data and/or modified data associated with the asset data 314. In one or more embodiments, the data aggregation component 304 repeatedly scans the edge devices 161a-161n to determine new data for storage in the multivariate time series database 318. In one or more embodiments, the data aggregation component 304 formats one or more portions of the asset data 314. For instance, in one or more embodiments, the data aggregation component 304 provides a formatted version of the asset data 314 to the multivariate time series database 318. In an embodiment, the formatted version of the asset data 314 is formatted with one or more defined formats associated with the one or more intervals of time and/or the one or more asset hierarchy levels. A defined format is, for example, a structure for data fields of the multivariate time series database 318. In various embodiments, the formatted version of the asset data 314 is stored in the multivariate time series database 318.

In one or more embodiments, the data aggregation component 304 identifies and/or groups data types associated with the asset data 314 based on the one or more intervals of time (e.g., one or more reporting intervals of time), the one or more asset hierarchy levels, and/or corresponding variables (e.g., corresponding features and/or attributes). In one or more embodiments, the data aggregation component 304 employs batching, concatenation of the asset data 314, identification of data types, merging of the asset data 314, grouping of the asset data 314, reading of the asset data 314 and/or writing of the asset data 314 to facilitate storage of the asset data 314 within the multivariate time series database 318. In one or more embodiments, the data aggregation component 304 groups data from the asset data 314 based on corresponding features and/or attributes of the data. In one or more embodiments, the data aggregation component 304 groups data from the asset data 314 based on corresponding identifiers (e.g., a matching asset hierarchy level, a matching asset, a matching connected building, etc.) for the asset data 314. In one or more embodiments, the data aggregation component 304 employs one or more locality-sensitive hashing techniques to group data from the asset data 314 based on similarity scores and/or calculated distances between different data in the asset data 314.

In one or more embodiments, the data aggregation component 304 organizes the formatted version of the asset data 314 based on a time series mapping of attributes for the asset data 314. For instance, in one or more embodiments, the data aggregation component 304 employs a hierarchical data format technique to organize the formatted version of the asset data 314 in the multivariate time series database 318. In one or more embodiments, the multivariate time series database 318 dynamically stores data (e.g., one or more portions of the asset data 314) based on type of data presented via a dashboard visualization. In one or more embodiments, data (e.g., one or more portions of the asset data 314) aggregated from the edge devices 161a-161n is converted into one or more metrics (e.g., a KPI metric, a duty KPI, a duty target KPI) prior to being stored in the multivariate time series database 318. In one or more embodiments, a metric (e.g. a KP metrics) consists of aspect data indicative of an aspect employed in a model to map an attribute to the metric (e.g., an operating power asset type attribute is mapped to a duty aspect, etc.), aggregation data indicative of information related to aggregation across time, rollup data indicative of an aggregate metric of an asset across an asset at one level as well as across a hierarchy asset, low limit data indicative of a low-limit constant derived from a digital twin model in real-time, high limit data indicative of a high-limit constant derived from a digital twin model in real-time, target data indicative of a target constant derived from a digital twin model in real-time, custom calculation data indicative of information related to custom calculations using aggregate data across time or asset, and/or other data related to the metric.

In one or more embodiments, at least a portion of the asset data 314 and/or data stored in the multivariate time series database 318 is employed as training data for one or more machine learning models. For example, in one or more embodiments, at least a portion of the asset data 314 and/or data stored in the multivariate time series database 318 is employed as training data for one or more one or more machine learning classifiers to facilitate classification of one or more events.

Additionally or alternatively, in one or more embodiments, the data aggregation component 304 is configured to perform data preprocessing with respect to the asset data 314 and/or data stored in the multivariate time series database 318. The data preprocessing includes, for example, reading the asset data 314 and/or data stored in the multivariate time series database 318 via one or more data pipelines. In one or more embodiments, the data aggregation component 304 performs one or more data cleaning processes to clean the asset data 314 and/or data stored in the multivariate time series database 318. In an embodiment, the data aggregation component 304 removes undefined data (e.g., Not a Number (NaN) values, etc.) from the asset data 314 and/or data stored in the multivariate time series database 318. In another embodiment, the data aggregation component 304 additionally or alternatively removes redundant columns (e.g., redundant columns associated with constant data values) from the formatted version of the asset data 314 and/or data stored in the multivariate time series database 318. Additionally, in one or more embodiments, the data aggregation component 304 transforms one or more portions of the asset data 314 and/or data stored in the multivariate time series database 318 into features (e.g., attributes). For example, in one or more embodiments, the data aggregation component 304 groups the asset data 314 and/or data stored in the multivariate time series database 318 into batches associated with respective fixed time intervals and extracts statistical features (e.g., statistical attributes) from the respective batch groups. Additionally, in one or more embodiments, the data aggregation component 304 further transforms (e.g., scales) one or more portions of the asset data 314 and/or data stored in the multivariate time series database 318 by adjusting a range of the data. Additionally, in one or more embodiments, the data aggregation component 304 further transforms (e.g., normalizes) one or more portions of the asset data 314 and/or data stored in the multivariate time series database 318 by scaling the data and/or generating a normal distribution (e.g., a Gaussian distribution) with respect to the data. In one or more embodiments, the data aggregation component 304 additionally generates data interaction columns for the asset data 314 and/or data stored in the multivariate time series database 318 to provide additional data to facilitate training and/or machine learning. For example, in one or more embodiments, the data aggregation component 304 generates one or more additional columns for the formatted version of the asset data 314 and/or data stored in the multivariate time series database 318 by multiplying two or more existing columns in the formatted version of the asset data 314 and/or data stored in the multivariate time series database 318.

The event classification component 306 is configured to classify one or more events associated with the asset data 314 and/or data stored in the multivariate time series database 318. In one or more embodiments, the event classification component 306 performs data augmentation with respect to the asset data 314 and/or data stored in the multivariate time series database 318 to facilitate classifying the one or more events. In one or more embodiments, the event classification component 306 performs the data augmentation to provide suitable data to train one or more machine learning classifiers to classify the one or more events. In one or more embodiments, the event classification component 306 employs one or more data augmentation techniques to augment the asset data 314 and/or data stored in the multivariate time series database 318 based on data associated with a predicted rare event and/or rule weighting. The one or more data augmentation techniques include, for example, a synthetic data augmentation for tabular data (SMOTE) technique that employs a K-Nearest Neighbors (KNN) technique with respect to data, an adaptive synthetic sampling approach (ADASYN) technique that employs a distribution to weight data, a support vector machine (SVM)-SMOTE technique that employs one or more SVMs in combination with the KNN technique, a SMOTE-TOMEK technique that removes data points of a majority class and/or adds data points for a minority class using SMOTE, a boosting based technique (e.g., a SMOTEBoost technique, a RareBoost technique, etc.), a cost sensitive classification technique (e.g., MetaCost, AdaCost, CSB, SSTBoost, etc.), a clustering based classification technique, an over-sampling a rare class technique, a linear regression model technique for increasing minority class samples, and/or another type of data augmentation technique.

In one or more embodiments, the event classification component 306 is configured to train one or more machine learning classifiers. For instance, in one or more embodiments, the event classification component 306 determines and/or tunes one or more parameters (e.g., one or more hyperparameters, one or more weights, etc.) for one or more learning processes associated with the one or more machine learning classifiers. In an example embodiment where a machine learning classifier is a random forest classifier, the event classification component 306 determines and/or tunes one or more parameters (e.g., one or more hyperparameters, one or more weights, etc.) during training of the random forest classifier. In another example embodiment, the one or more parameters (e.g., one or more hyperparameters, one or more weights, etc.) includes a parameter associated with a number of processors to be employed by a machine learning classifier, a number of processing trees to be included in a machine learning classifier, a number of split points for a processing tree included in a machine learning classifier, a number of samples to be included in data for a machine learning classifier, a size of a node in a machine learning classifier, a number of random samples to be included in data for a machine learning classifier, and/or one or more other parameters for a machine learning classifier. Based on the one or more parameters (e.g., one or more hyperparameters, one or more weights, etc.) determined and/or tuned by the event classification component 306, in one or more embodiments, the event classification component 306 trains the respective machine learning classifier to detect presence or absence of a particular event associated with a defined data signature. In one or more embodiments, the event classification component 306 trains and/or generates respective machine learning classifiers for respective defined data signatures. In one or more embodiments, a trained version of a machine learning classifier is configured with, for example, one or more decision rules, one or more decision trees, a classification type associated with a set of features, and/or a model score for a particular classification type. In one or more embodiments, a trained version of a machine learning classifier is correlated with a score (e.g., a quality score, an F1 score, a recall score, a precision score, a correlation score, a Matthews correlation coefficient (MCC) score, and/or another type of scoring metric).

In one or more embodiments, the event classification component 306 determines accuracy of a classified event by analyzing data prior to time series data associated with a classified event and/or data after time series data associated with a classified event. For example, in one or more embodiments, the event classification component 306 determines slope, an intercept, and/or a degree of oscillation associated with data prior to time series data associated with a classified event and/or data after time series data associated with a classified event. Additionally, the event classification component 306 compares the determined slope, intercept, and/or degree of oscillation associated with the classified event with another slope, another intercept, and/or another degree of oscillation associated with another classified event to determine whether noise data and/or statistical parameters associated with the classified events are within a certain degree of similarity. If so, the classified event is determined to be an accurately classified event. However, if not, the classified event is determined to not be an accurately classified event.

In one or more embodiments, the asset performance management computer system 302 (e.g., the event classification component 306 of the asset performance management computer system 302) receives a request 320. In an embodiment, the request 320 is a request to classify one or more events associated with one or more assets in a portfolio of assets. For example, in an embodiment, the request 320 is a request to classify one or more events associated with the edge devices 161*a*-*n*. In one or more embodiments, the request 320 is a request to classify one or more events in the asset data 314 and/or multivariate data stored in the multivariate time series database 318. In one or more embodiments, the request 320 includes a request to generate a dashboard visualization associated with the one or more assets in the portfolio of assets (e.g., the edge devices 161*a*-161*n* included in a portfolio of assets). In one or more embodiments, the request 320 is received in response to an action (e.g., a user-initiated action, modification of an interactive graphical element, etc.) initiated via an electronic interface of a computing device. In one or more embodiments, the request 320 is received in response to an action initiated via a processing unit (e.g., an edge device, a controller, etc.) associated with the one or more assets. In one or more embodiments, the request 320 is received in response to an asset schedule satisfying a defined criterion (e.g., an asset schedule interval being above a threshold timer). In one or more embodiments, the request 320 is received in response to detection of a possible anomaly associated with an asset (e.g., in response to an anomaly index for an asset being greater than a specified threshold level).

In one or more embodiments, the request 320 includes one or more asset descriptors that describe one or more assets in the portfolio of assets. For instance, in one or more embodiments, the request 320 includes one or more asset descriptors that describe the edge devices 161*a*-161*n*. An asset descriptor includes, for example, an asset name, an asset identifier, an asset level and/or other information associated with an asset. Additionally or alternatively, in one or more embodiments, the request 320 includes one or more user identifiers describing a user role for a user associated with access of a dashboard visualization. A user identifier includes, for example, an identifier for a user role name (e.g., a manager, an executive, a maintenance engineer, a process engineer, etc.). Additionally or alternatively, in one or more embodiments, the request 320 includes one or more metrics context identifiers describing context for the metrics. A metrics context identifier includes, for example, an identifier for a plant performance metric, an asset performance metric, a goal (e.g., review production related to one or more assets, etc.). Additionally or alternatively, in one or more embodiments, the request 320 includes one or more time interval identifiers describing an interval of time associated with at least a portion of aggregated multivariate data stored in the multivariate time series database 318. A time interval identifier describes, for example, an interval of time for aggregated data such as hourly, daily, monthly, yearly etc. In one or more embodiments, a time interval identifier is a reporting time identifier describing an interval of time for the metrics. Additionally or alternatively, in one or more embodiments, the request 320 includes a machine learning classifier identifier describing a type of machine learning classifier and/or a type of classification algorithm (e.g., random forest, weighted SVM, KNN, long short term memory (LSTM), etc.) to employ to classify the one or more events in the asset data 314 and/or multivariate data stored in the multivariate time series database 318.

In response to the request 320, the event classification component 306 obtains aggregated multivariate data associated with the one or more assets. For example, in one or more embodiments, the event classification component 306 obtains the aggregated multivariate data from the multivariate time series database 318 and/or directly from the edge devices 161*a*-*n*. Additionally, in one or more embodiments, the event classification component 306 determines one or more data signatures associated with the aggregated multivariate data. The one or more data signatures are, for example, one or more digital patterns (e.g., one or more digital fingerprints) that correspond to one or more candidate events associated with one or more defined event attributes. In an embodiment, a data signature corresponds to an aggregated data pattern associated with one or more sensor outputs of one or more assets in an industrial environment. In another embodiment, a data signature corresponds to an aggregated data pattern associated with one or more motors of one or more assets in a warehouse environment. In another embodiment, a data signature corresponds to an aggregated data pattern associated with environmental data related to one or more assets in a building environment. For example, in one or more embodiments, the event classification component 306 determines a data signature for at least a portion of the aggregated multivariate data that corresponds to sensor output of the one or more assets, a data pattern for one or more motors related to the one or more assets, and/or environmental data related to the one or more assets. In one or more embodiments, the event classification component 306 obtains the aggregated multivariate data based on the one or more time interval identifiers and/or the user identifier.

The event classification component 306 is configured to label one or more events associated with the multivariate data. In one or more embodiments, the event classification component 306 is configured to label the one or more events associated with the multivariate data based on respective defined data signatures for respective defined events associated with a defined event attribute. For example, in one or more embodiments, the event classification component 306 is configured to determine, based on respective defined data signatures for respective defined events associated with a defined event attribute, a respective label for one or more events associated with the multivariate data. The respective defined data signatures are, for example, one or more defined digital patterns (e.g., one or more defined digital fingerprints) that correspond to one or more historical events and/or one or more predetermined events associated with one or more defined event attributes. In one or more embodiments, the respective defined data signatures are generated in response to the respective defined events satisfying a defined ratio of event features to event outcomes. For example, a ratio of event features to event outcomes can define a particular type of event (e.g., a rare event) associated with an asset. In one or more embodiments, the event classification component 306 is configured to determine, based on respective defined data signatures for respective defined events associated with a defined event attribute, a respective label for one or more events associated with a data signature (e.g., a data signature for at least a portion of the aggregated multivariate data that corresponds to sensor output of the one or more assets, a data pattern for one or more motors related to the one or more assets, and/or environmental data related to the one or more assets). In one or more embodiments, the event classification component 306 is configured to determine the respective label based on a comparison between the data signature and the respective defined data signatures. For example, in one or more embodiments, the event classification component 306 is configured to determine the respective label based on a comparison between respective attributes and/or data patterns of the data signature and the respective defined data signatures.

In one or more embodiment, in response to the request 320, the dashboard visualization component 308 generates dashboard visualization data 322 associated with the one or more events. For instance, in one or more embodiments, the dashboard visualization component 308 provides the dashboard visualization to an electronic interface of a computing device based on the dashboard visualization data 322. In one or more embodiments, the dashboard visualization data 322 and/or the dashboard visualization associated with the dashboard visualization data 322 includes data associated with the one or more events. In one or more embodiments, the dashboard visualization data 322 and/or the dashboard visualization associated with the dashboard visualization data 322 includes one or more metrics associated with the one or more events.

Additionally, in one or more embodiments, the dashboard visualization component 308 performs one or more actions based on the one or more events. For instance, in one or more embodiments, the dashboard visualization component 308 generates dashboard visualization data 322 associated with the one or more events. In an embodiment, an action includes generating a user-interactive electronic interface that renders a visual representation of data associated with the one or more events. In another embodiment, an action from the one or more actions includes transmitting, to a computing device, one or more notifications associated with the one or more events. In another embodiment, an action from the one or more actions includes providing an optimal process condition for an asset associated with the asset data 314 based on the one or more events. For example, in another embodiment, an action from the one or more actions includes adjusting a set-point and/or a schedule for an asset associated with the asset data 314 based on the one or more events. In another embodiment, an action from the one or more actions includes one or more corrective action to take for an asset associated with the asset data 314 based on the one or more events. In another embodiment, an action from the one or more actions includes providing an optimal maintenance option for an asset associated with the asset data 314 based on the one or more events. In another embodiment, an action from the one or more actions includes an action associated with the application services layer 225, the applications layer 230, and/or the core services layer 235 based on the one or more events. In certain embodiments, an action from the one or more actions includes configuring the dashboard visualization to allow a user to modify a label for an event from the one or more events and/or to generate a new label for the event via the electronic interface. In certain embodiments, an action from the one or more actions includes, in response to generating the new label for the event and/or a determination that the new label satisfies a defined criterion with respect to historical labels, transmitting a notification to the electronic interface to indicate likelihood of labeling accuracy. In certain embodiments, an action from the one or more actions includes retraining one or more machine learning classifiers associated with the respective defined data signatures based on the one or more events. For example, in certain embodiments, one or more weights and/or one or more parameters for a machine learning classifier associated with a defined data signature is updated based on the one or more events. In certain embodiments, an action from the one or more actions includes configuring the dashboard visualization (e.g., based on the one or more events) to provide individual control of the one or more assets via the dashboard visualization. For example, in certain embodiments, the dashboard visualization is configured to receive input from a user to modify one or more parameters of one or more assets. In another example, in certain embodiments, the dashboard visualization is configured to present a notification to allow acceptances of one or more changes related to one or more assets. In another example, in certain embodiments, the dashboard visualization is configured to present a digital twin visualization of one or more assets to provide individual control of the one or more assets via the dashboard visualization. In certain embodiments, an action from the one or more actions includes configuring the dashboard visualization (e.g., based on the one or more events) to facilitate creation of one or more work orders for the one or more assets.

Figure 4:
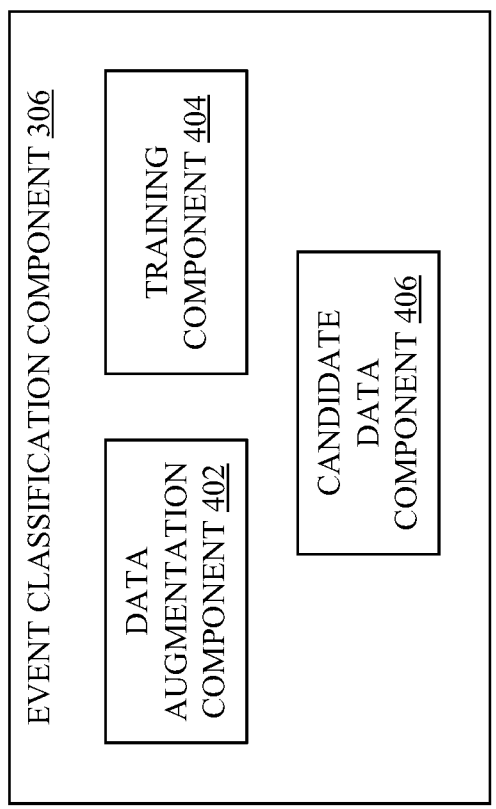
FIG. 4 illustrates an exemplary event classification component, in accordance with one or more embodiments described herein.

FIG. 4 illustrates an exemplary event classification component (e.g., event classification component 306) according to one or more described features of one or more embodiments of the disclosure. In one or more embodiments, the event classification component 306 includes a data augmentation component 402, a training component 404, and/or a candidate data component 406. In one or more embodiments, the data augmentation component 402 performs data augmentation with respect to the asset data 314 and/or data stored in the multivariate time series database 318 to facilitate classifying the one or more events. In one or more embodiments, the data augmentation component 402 performs the data augmentation to provide suitable data to train one or more machine learning classifiers to classify the one or more events. In one or more embodiments, the data augmentation component 402 employs one or more data augmentation techniques to augment the asset data 314 and/or data stored in the multivariate time series database 318 based on data associated with a predicted rare event and/or rule weighting. The one or more data augmentation techniques include, for example, a SMOTE technique that employs a KNN technique with respect to data, an ADASYN technique that employs a distribution to weight data, an SVM-SMOTE technique that employs one or more SVMs in combination with the KNN technique, a SMOTE-TOMEK technique that removes data points of a majority class and/or adds data points for a minority class using SMOTE, a boosting based technique (e.g., a SMOTEBoost technique, a RareBoost technique, etc.), a cost sensitive classification technique (e.g., MetaCost, AdaCost, CSB, SSTBoost, etc.), a clustering based classification technique, an over-sampling a rare class technique, a linear regression model technique for increasing minority class samples, and/or another type of data augmentation technique.

In one or more embodiments, the training component 404 is configured to train one or more machine learning classifiers. For instance, in one or more embodiments, the training component 404 determines and/or tunes one or more parameters (e.g., one or more hyperparameters, one or more weights, etc.) for one or more learning processes associated with the one or more machine learning classifiers. In an example embodiment where a machine learning classifier is a random forest classifier, the training component 404 determines and/or tunes one or more parameters (e.g., one or more hyperparameters, one or more weights, etc.) during training of the random forest classifier. In another example embodiment, the one or more parameters (e.g., one or more hyperparameters, one or more weights, etc.) includes a parameter associated with a number of processors to be employed by a machine learning classifier, a number of processing trees to be included in a machine learning classifier, a number of split points for a processing tree included in a machine learning classifier, a number of samples to be included in data for a machine learning classifier, a size of a node in a machine learning classifier, a number of random samples to be included in data for a machine learning classifier, and/or one or more other parameters for a machine learning classifier. Based on the one or more parameters (e.g., one or more hyperparameters, one or more weights, etc.) determined and/or tuned by training component 404, in one or more embodiments, the training component 404 trains the respective machine learning classifier to detect presence or absence of a particular event associated with a defined data signature. In one or more embodiments, the training component 404 trains and/or generates respective machine learning classifiers for respective defined data signatures. In one or more embodiments, a trained version of a machine learning classifier is configured with, for example, one or more decision rules, one or more decision trees, a classification type associated with a set of features, and/or a model score for a particular classification type. In one or more embodiments, a trained version of a machine learning classifier is correlated with a score (e.g., a quality score, an F1 score, a recall score, a precision score, a correlation score, an MCC score, and/or another type of scoring metric).

In one or more embodiments, the candidate data component 406 is configured for candidate data classification of one or more events. In one or more embodiments, the candidate data component 406 executes one or more machine learning classifiers associated with respective defined events to provide a classification of the one or more events. In one or more embodiments, the candidate data component 406 employs one or more data historians to provide incremental classification with respect to one or more machine learning classifiers. In one or more embodiments, the candidate data component 406 derives a feature space for an event based on a feature space employed during training of a machine learning classifier associated with the event. In one or more embodiments, the candidate data component 406 executes a machine learning classifier for a defined event based on parameter obtained during training of the machine learning classifier. In one or more embodiments, the candidate data component 406 correlates a machine learning classifier for a defined event with a quality score (e.g., a goodness of fit score).

Figure 5:
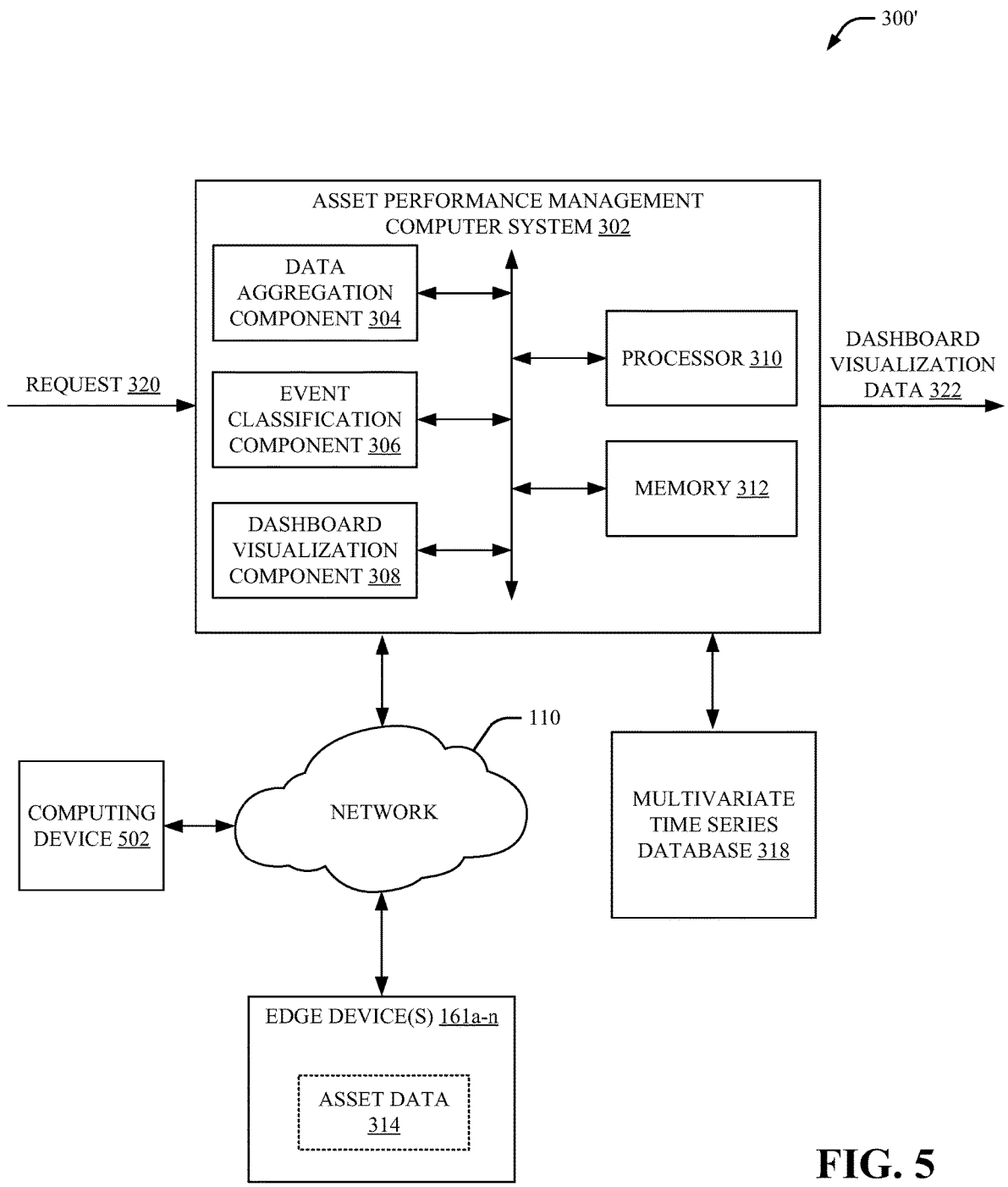
FIG. 5 illustrates another system that provides an exemplary environment, in accordance with one or more embodiments described herein.

FIG. 5 illustrates a system 300' that provides an exemplary environment according to one or more described features of one or more embodiments of the disclosure. In an embodiment, the system 300' corresponds to an alternate embodiment of the system 300 shown in FIG. 3. According to an embodiment, the system 300' includes the asset performance management computer system 302, the edge devices 161a-161n, the multivariate time series database 318 and/or a computing device 502. In one or more embodiments, the asset performance management computer system 302 is in communication with the edge devices 161a-161n and/or the computing device 502 via the network 110. The computing device 502 is a mobile computing device, a smartphone, a tablet computer, a mobile computer, a desktop computer, a laptop computer, a workstation computer, a wearable device, a virtual reality device, an augmented reality device, or another type of computing device located remote from the asset performance management computer system 302.

In one or more embodiments, the dashboard visualization component 308 communicates the dashboard visualization data 322 to the computing device 502. For example, in one or more embodiments, the dashboard visualization data 322 includes one or more visual elements for a visual display (e.g., a user-interactive electronic interface) of the computing device 502 that renders a visual representation of the data associated with the one or more events. In certain embodiments, the visual display of the computing device 502 displays one or more graphical elements associated with the dashboard visualization data 322 (e.g., the data associated with the one or more events). In another example, in one or more embodiments, the dashboard visualization data 322 includes one or notifications associated with the one or more events. In one or more embodiments, the dashboard visualization data 322 allows a user associated with the computing device 502 to make decisions and/or perform one or more actions with respect to the one or more events. In one or more embodiments, the dashboard visualization data 322 allows a user associated with the computing device 502 to control the one or more portions of the one or more assets (e.g., one or more portions of the edge devices 161a-161n). In one or more embodiments, the dashboard visualization data 322 allows a user associated with the computing device 502 to generate one or more work orders for the one or more assets.

Figure 6:
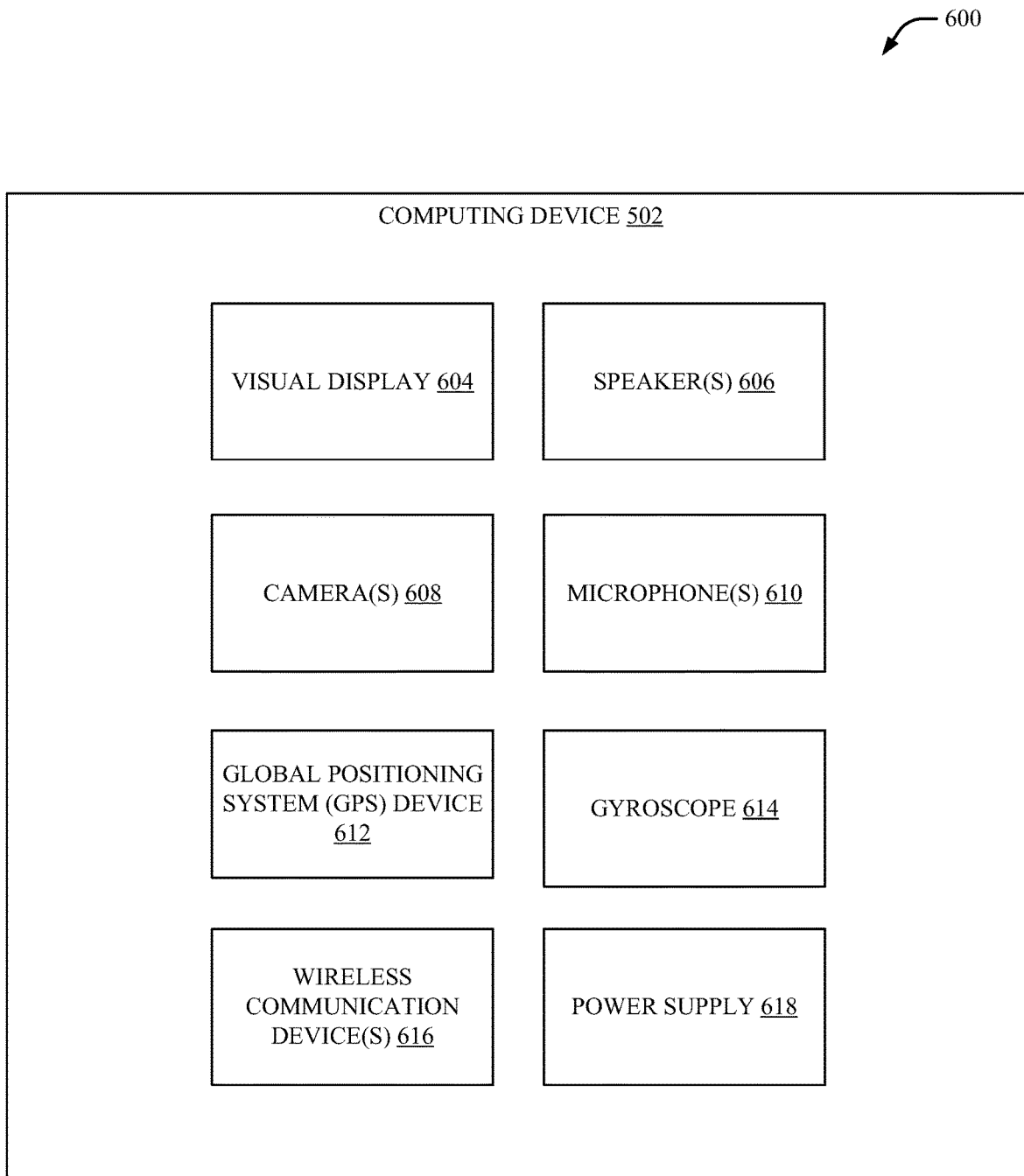
FIG. 6 illustrates an exemplary computing device, in accordance with one or more embodiments described herein.

FIG. 6 illustrates a system 600 according to one or more embodiments of the disclosure. The system 600 includes the computing device 502. In one or more embodiments, the computing device 502 employs mobile computing, augmented reality, cloud-based computing, IoT technology and/or one or more other technologies to provide performance data, video, audio, text, graphs, charts, real-time data, graphical data, one or more communications, one or more messages, one or more notifications, and/or other media data associated with the one or more metrics. The computing device 502 includes mechanical components, electrical components, hardware components and/or software components to facilitate determining prioritized actions and/or one or more metrics associated with the asset data 314. In the embodiment shown in FIG. 5, the computing device 502 includes a visual display 604, one or more speakers 606, one or more cameras 608, one or more microphones 610, a global positioning system (GPS) device 612, a gyroscope 614, one or more wireless communication devices 616, and/or a power supply 618.

In an embodiment, the visual display 604 is a display that facilitates presentation and/or interaction with one or more portions of the dashboard visualization data 322. In one or more embodiments, the computing device 502 displays an electronic interface (e.g., a graphical user interface) associated with an asset performance management platform. In one or more embodiments, the visual display 604 is a visual display that renders one or more interactive media elements via a set of pixels. The one or more speakers 606 include one or more integrated speakers that project audio. The one or more cameras 608 include one or more cameras that employ autofocus and/or image stabilization for photo capture and/or real-time video. The one or more microphones 610 include one or more digital microphones that employ active noise cancellation to capture audio data. The GPS device 612 provides a geographic location for the computing device 502. The gyroscope 614 provides an orientation for the computing device 502. The one or more wireless communication devices 616 includes one or more hardware components to provide wireless communication via one or more wireless networking technologies and/or one or more short-wavelength wireless technologies. The power supply 618 is, for example, a power supply and/or a rechargeable battery that provides power to the visual display 604, the one or more speakers 606, the one or more cameras 608, the one or more microphones 610, the GPS device 612, the gyroscope 614, and/or the one or more wireless communication devices 616. In certain embodiments, the dashboard visualization data 322 associated with the prioritized actions and/or the one or more metrics is presented via the visual display 604 and/or the one or more speakers 606.

Figure 7:
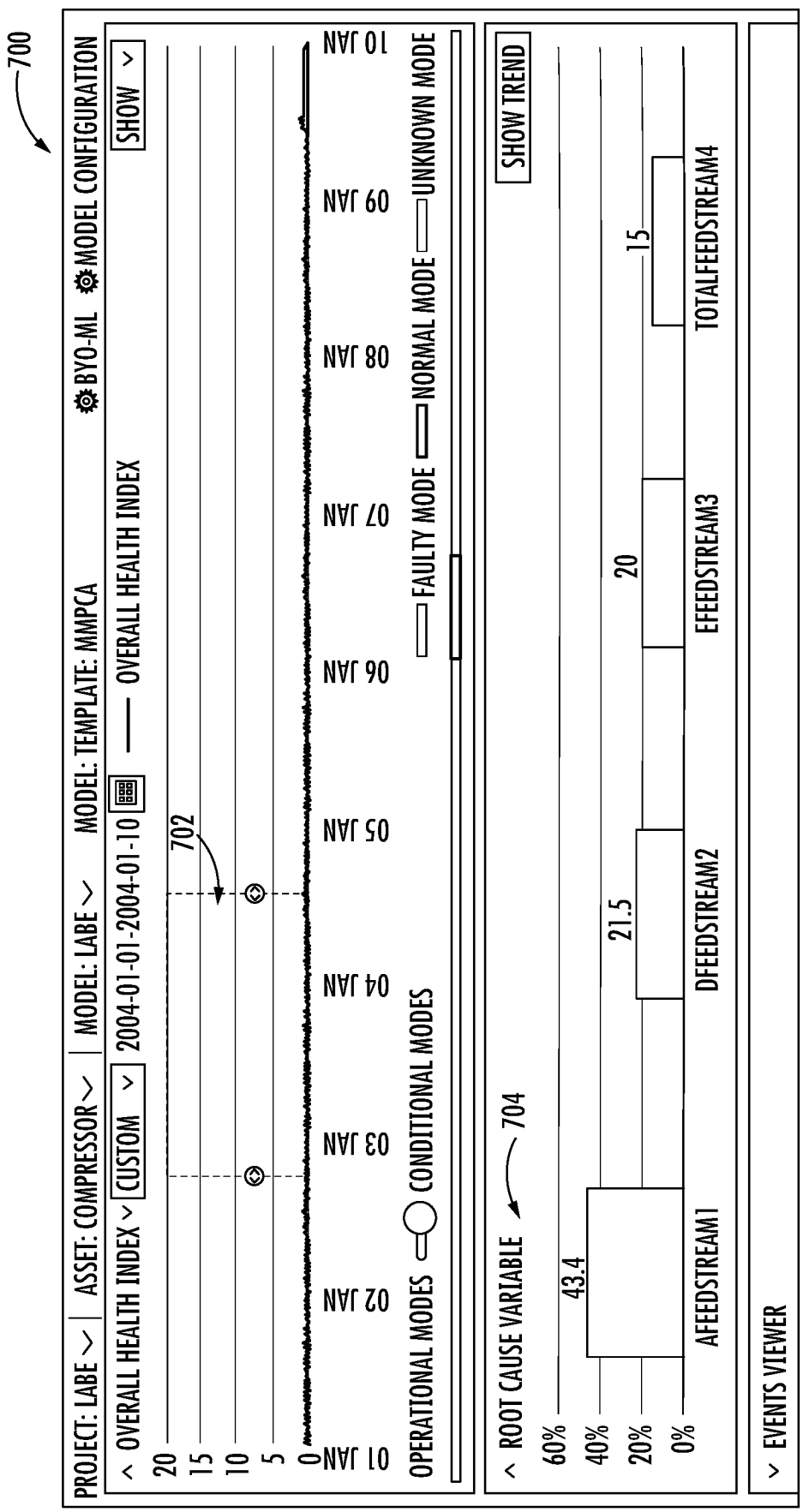
FIG. 7 illustrates an exemplary electronic interface, in accordance with one or more embodiments described herein.

FIG. 7 illustrates an exemplary electronic interface 700 according to one or more embodiments of the disclosure. In an embodiment, the electronic interface 700 is an electronic interface of the computing device 502 that is presented via the visual display 604. In one or more embodiments, a dashboard visualization is presented via the electronic interface 700. In certain embodiments, the data visualization presented via the electronic interface 700 presents an asset analytics tool to facilitate event labeling to label a data signature 702 related to asset data (e.g., multivariate data). In an embodiment, the data signature 702 corresponds to an event signature (e.g., a fault signature) for an asset and/or an asset process associated with the asset data. In one or more embodiments, a machine learning classifier is trained based on the data signature 702. In one or more embodiments, the data signature 702 is associated with an interval of time that begins at time A and ends at time B. In one or more embodiments, the data signature 702 is associated with root cause variable(s) for the data signature 702.

Figure 8:
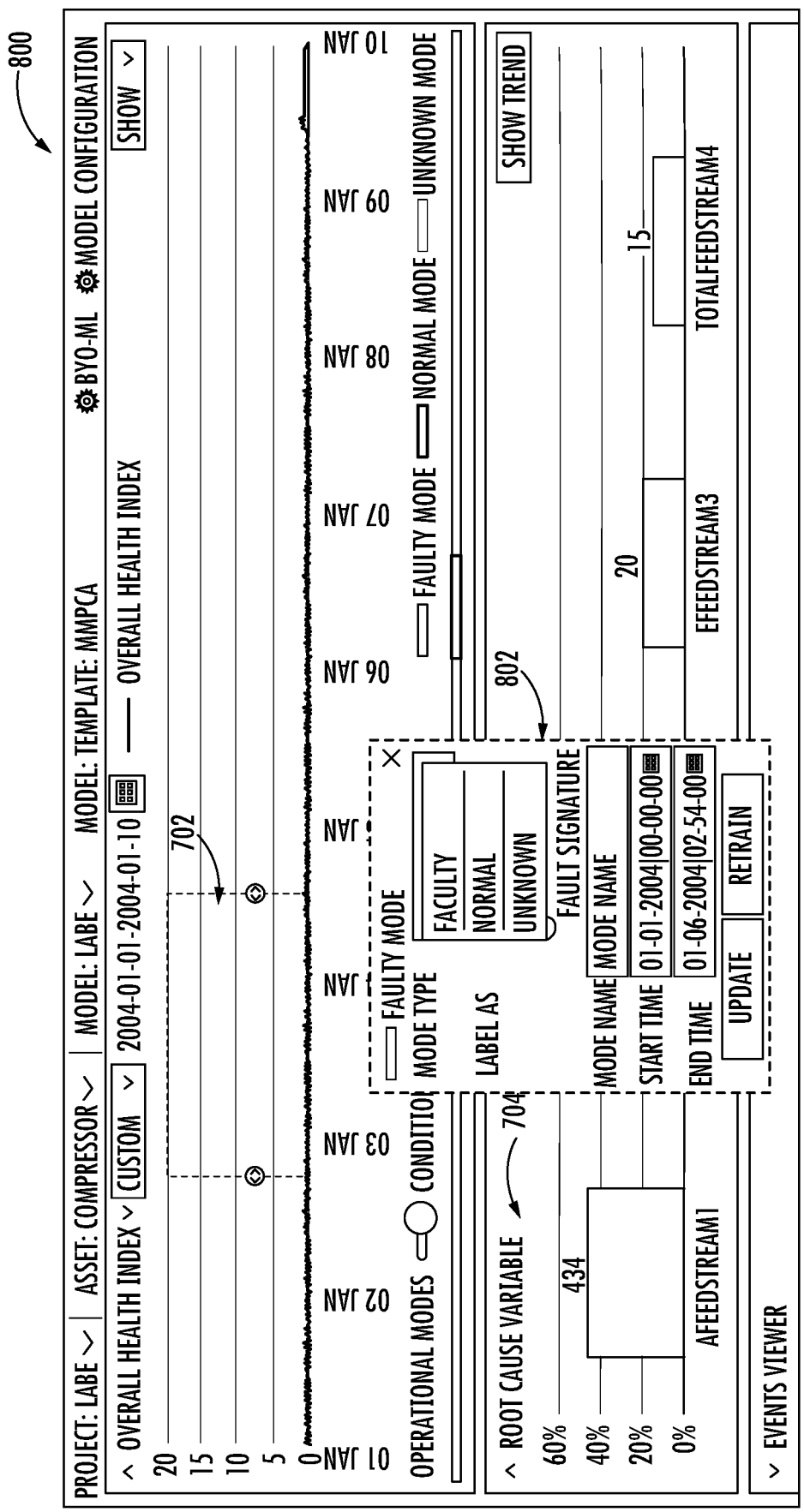
FIG. 8 illustrates another exemplary electronic interface, in accordance with one or more embodiments described herein.

FIG. 8 illustrates an exemplary electronic interface 800 according to one or more embodiments of the disclosure. In an embodiment, the electronic interface 800 is an electronic interface of the computing device 502 that is presented via the visual display 604. In one or more embodiments, a dashboard visualization is presented via the electronic interface 800. In certain embodiments, the data visualization presented via the electronic interface 800 presents an asset analytics tool to facilitate event labeling to label the data signature 702. In one or more embodiments, the electronic interface 800 includes an interactive graphical element 802 that facilitates selection of a type of data signature label for the data signature 702. In certain embodiments, the interactive graphical element 802 provides configuration capabilities for a timeframe, a mode (e.g., a machine learning mode, a type of event classification etc.), asset information, a label, and/or other information related to the data signature 702. In certain embodiments, the interactive graphical element 802 is configured to initiate generation of the request 320.

Figure 9:
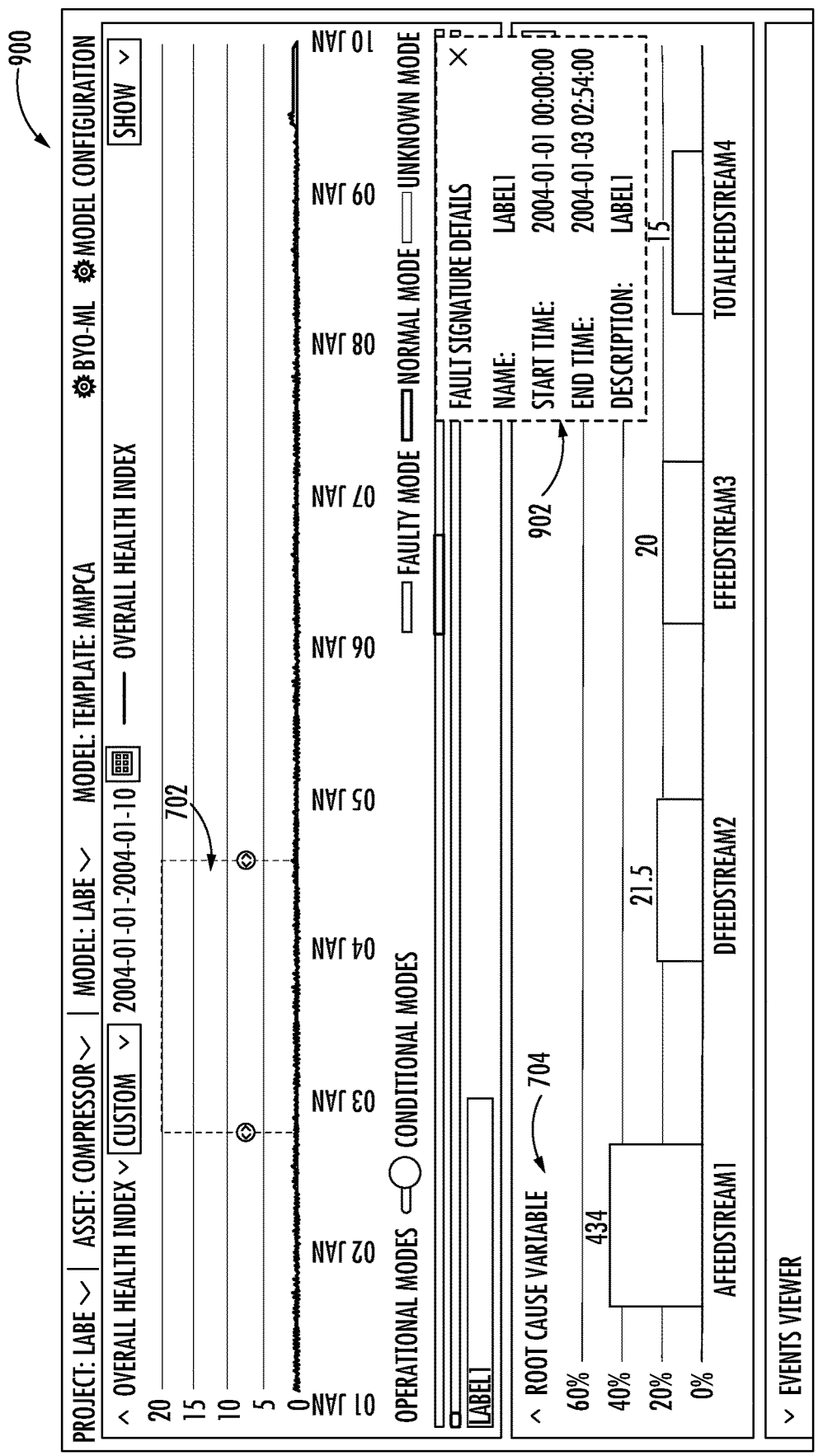
FIG. 9 illustrates another exemplary electronic interface, in accordance with one or more embodiments described herein.

FIG. 9 illustrates an exemplary electronic interface 900 according to one or more embodiments of the disclosure. In an embodiment, the electronic interface 900 is an electronic interface of the computing device 502 that is presented via the visual display 604. In one or more embodiments, a dashboard visualization is presented via the electronic interface 900. In certain embodiments, the data visualization presented via the electronic interface 900 presents an asset analytics tool to facilitate event labeling to label the data signature 702. In one or more embodiments, the electronic interface 900 includes an interactive graphical element 902 that provides data signature details for the data signature 702 such as, for example, a name of the data signature 702, a start time for the data signature 702, an end time for the data signature 702, and/or a description of the data signature 702. In certain embodiments, the interactive graphical element 902 additionally or alternatively provides configuration capabilities for a timeframe, a mode (e.g., a machine learning mode, a type of event classification etc.), asset information, a label, and/or other information related to the data signature 702. In certain embodiments, the interactive graphical element 902 is configured to initiate generation of the request 320.

Figure 10:
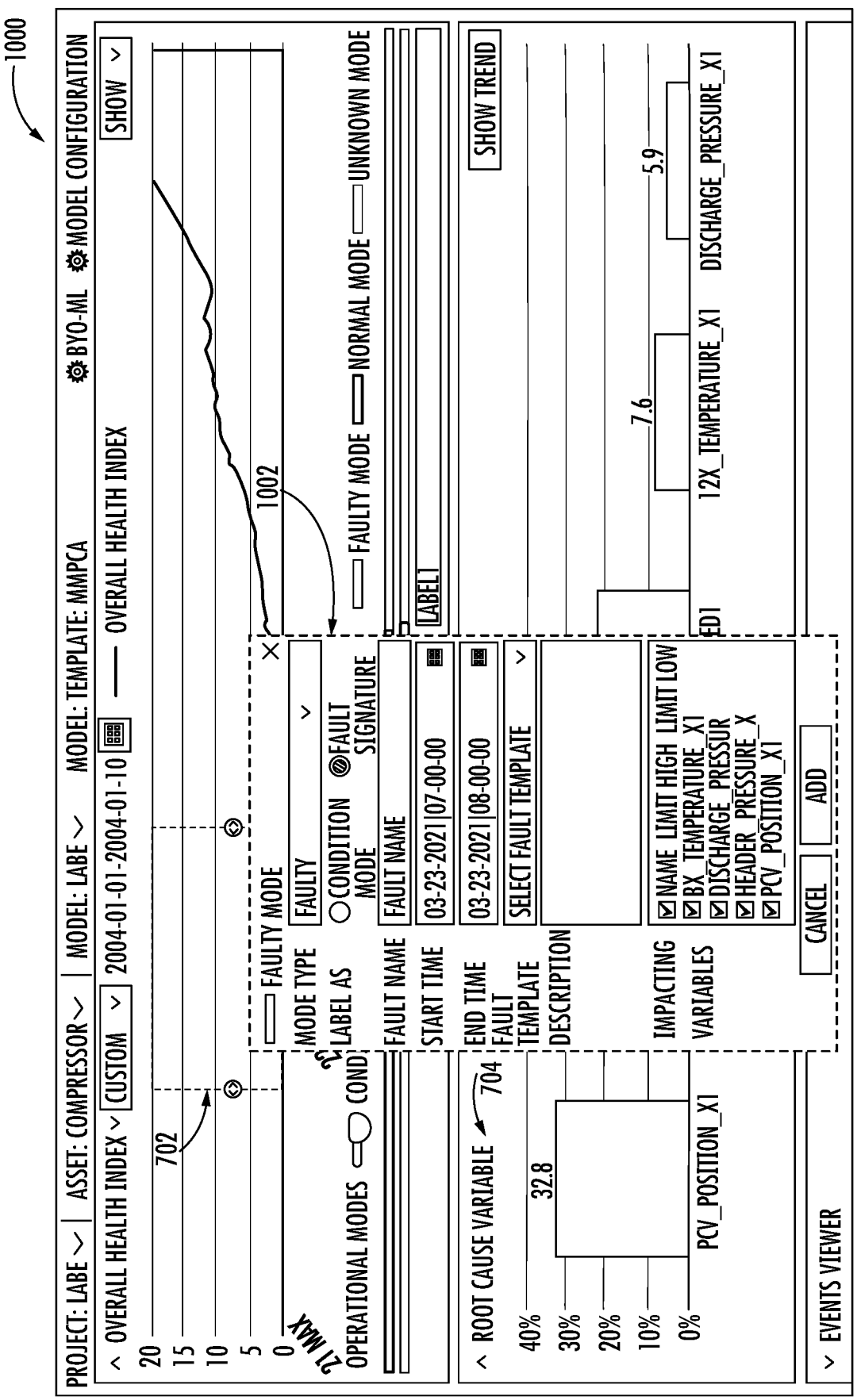
FIG. 10 illustrates another exemplary electronic interface, in accordance with one or more embodiments described herein.

FIG. 10 illustrates an exemplary electronic interface 1000 according to one or more embodiments of the disclosure. In an embodiment, the electronic interface 1000 is an electronic interface of the computing device 502 that is presented via the visual display 604. In one or more embodiments, a dashboard visualization is presented via the electronic interface 1000. In certain embodiments, the data visualization presented via the electronic interface 1000 presents an asset analytics tool to facilitate event labeling to label the data signature 702. In one or more embodiments, the electronic interface 1000 includes an interactive graphical element 1002 that allows a user to specify one or more model variables contributing to the data signature 702 by selecting the one or more model variables from an impact variables list included in the interactive graphical element 1002. In certain embodiments, the interactive graphical element 1002 provides configuration capabilities for a timeframe, a mode (e.g., a machine learning mode, a type of event classification etc.), asset information, a label, selection of one or more asset variables, a data signature template, and/or other information related to the data signature 702. In certain embodiments, the interactive graphical element 1002 is configured to initiate generation of the request 320. In certain embodiments, one or more portions of the electronic interface 1000 is configured with a visual indicator (e.g., a color) related to asset data to indicate a fault, an event, and/or a mode associated with one or more assets.

Figure 11:
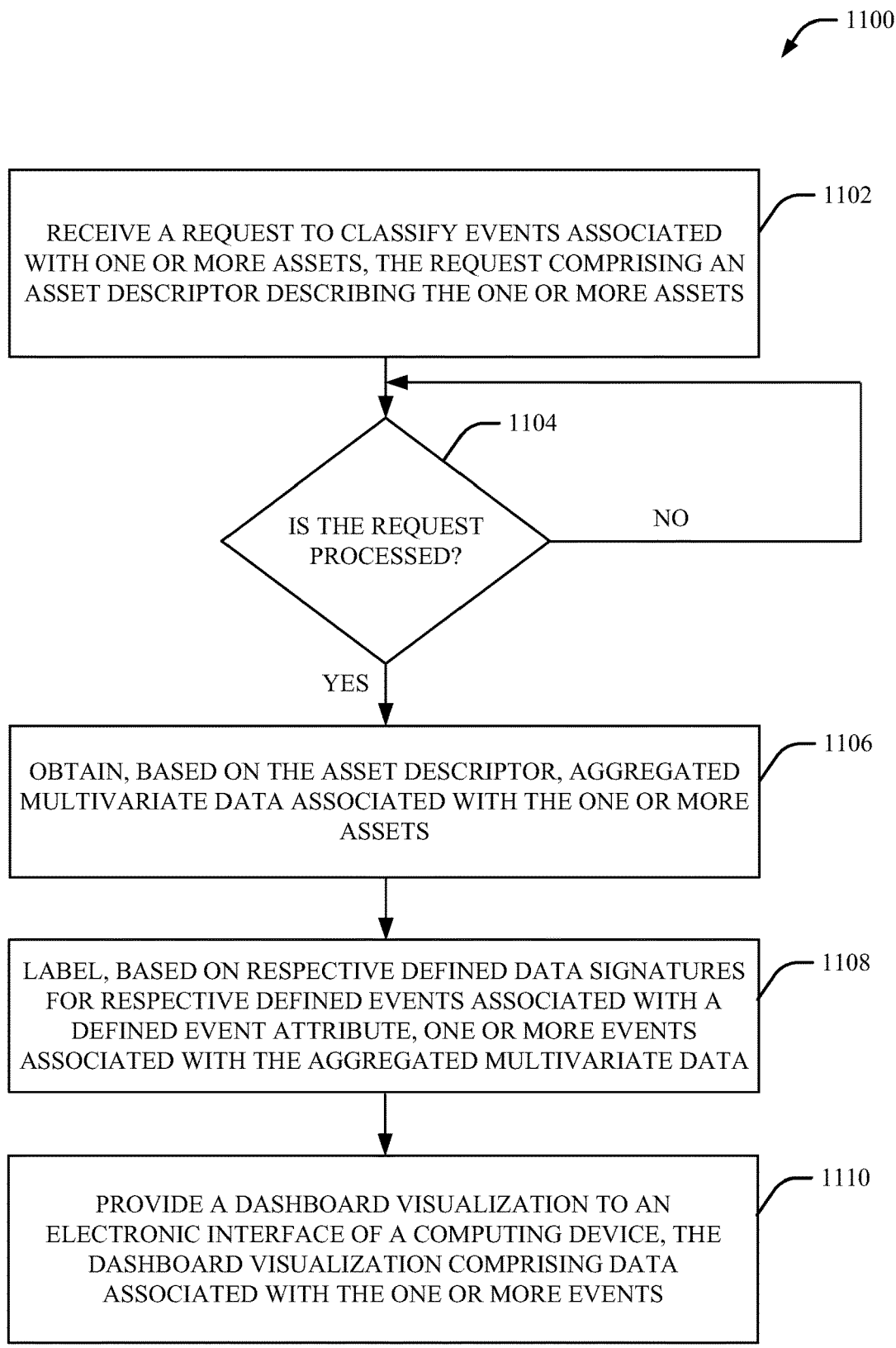
FIG. 11 illustrates a flow diagram for classification of events using pattern recognition in multivariate data, in accordance with one or more embodiments described herein.

FIG. 11 illustrates a method 1100 for classification of events using pattern recognition in multivariate data, in accordance with one or more embodiments described herein. The method 1100 is associated with the asset performance management computer system 302, for example. For instance, in one or more embodiments, the method 1100 is executed at a device (e.g. the asset performance management computer system 302) with one or more processors and a memory. In one or more embodiments, the method 1100 begins at block 1102 that receives (e.g., by the event classification component 306 and/or the dashboard visualization component 308) a request to classify events associated with one or more assets, the request comprising an asset descriptor describing the one or more assets. The request provides one or more technical improvements such as, but not limited to, facilitating interaction with a computing device and/or extended functionality for a computing device. In one or more embodiments, the receiving the request includes receiving the request in response to an action initiated via the electronic interface of the computing device. In one or more embodiments, the receiving the request includes receiving the request in response to an action initiated via a processing unit associated with the one or more assets.

At block 1104, it is determined whether the request is processed. If no, block 1104 is repeated to determine whether the request is processed. If yes, the method 1100 proceeds to block 1106. In response to the request, block 1106 that obtains, based on the asset descriptor, aggregated multivariate data associated with the one or more assets. The obtaining provides one or more technical improvements such as, but not limited to, extended functionality for a computing device.

In response to the request, the method 1100 also includes a block 1108 that labels (e.g., by the event classification component 306) one or more events associated with the aggregated multivariate data based on respective defined data signatures for respective defined events associated with a defined event attribute. In one or more embodiments, the labeling includes determining, based on respective defined data signatures for respective defined events associated with a defined event attribute, a respective label for one or more events associated with the aggregated multivariate data. The labeling provides one or more technical improvements such as, but not limited to, improving accuracy of the dashboard visualization. In one or more embodiments, the obtaining the aggregated multivariate data includes determining one or more data signatures associated with the aggregated multivariate data, and the labeling includes labeling the one or more events based on a comparison between the one or more data signatures and the respective defined data signatures. In one or more embodiments, the request further comprises a time interval identifier describing an interval of time associated with the aggregated multivariate data, and the method 1100 further includes selecting the respective defined data signatures based on the time interval identifier. In one or more embodiments, the request further comprises a user identifier describing a user role for a user associated with access of the dashboard visualization via the electronic interface, and the obtaining the aggregated multivariate data includes obtaining the aggregated multivariate data based on the user identifier. In one or more embodiments, the request further comprises a metrics context identifier describing context for metrics associated with the events, and the obtaining the aggregated multivariate data includes obtaining the aggregated multivariate data based on the metrics context identifier. In one or more embodiments, the labeling includes performing one or more pattern recognition processes between the aggregated multivariate data and the respective defined data signatures. For example, in one or more embodiments, the labeling comprises identifying one or more patterns between the aggregated multivariate data and the respective defined data signatures.

In response to the request, the method 1100 also includes a block 1110 that provides (e.g., by the dashboard visualization component 308) a dashboard visualization to an electronic interface of a computing device, the dashboard visualization comprising data associated with the one or more events. The providing the dashboard visualization with the data associated with the one or more events provides one or more technical improvements such as, but not limited to, what and/or how to present information via a computing device. In one or more embodiments, the method 1100 additionally or alternatively includes configuring the dashboard visualization based on the user identifier. In one or more embodiments, the method 1100 additionally or alternatively includes altering one or more visual elements of the dashboard visualization based on the one or more events. In one or more embodiments, the method 1100 additionally or alternatively includes altering a visual representation of the data associated with the one or more events based on user input data provided via the electronic interface. In one or more embodiments, the providing the dashboard visualization includes displaying one or more metrics associated with the one or more events. In one or more embodiments, the method 1100 additionally or alternatively includes configuring the dashboard visualization to provide individual control of the one or more assets via the dashboard visualization. In one or more embodiments, the method 1100 additionally or alternatively includes configuring the dashboard visualization to facilitate creation of one or more work orders for the one or more assets.

In one or more embodiments, the method 1100 additionally or alternatively includes determining a data signature for at least a portion of the aggregated multivariate data that corresponds to sensor output of the one or more assets, data pattern for one or more motors related to the one or more assets, and/or environmental data related to the one or more assets. Additionally, in one or more embodiments, the method 1100 includes determining, based on respective defined data signatures for respective defined events associated with a defined event attribute, a respective label for one or more events associated with the data signature. In one or more embodiments, the method 1100 additionally or alternatively includes determining the respective label based on a comparison between the data signature and the respective defined data signatures.

In one or more embodiments, the method 1100 additionally or alternatively includes generating the respective defined data signatures in response to the respective defined events satisfying statistical event data associated with event features and event outcomes.

In one or more embodiments, the method 1100 additionally or alternatively includes generating the respective defined data signatures in response to the respective defined events satisfying a defined ratio of event features to event outcomes.

In one or more embodiments, the method 1100 additionally or alternatively includes generating a new defined data signature for a new defined event based on a data augmentation technique associated with the respective defined data signatures. For example, in one or more embodiments, the method 1100 additionally or alternatively includes generating a new defined data signature for a new defined event by augmenting one or more portions of a defined data signature.

In one or more embodiments, the method 1100 additionally or alternatively includes generating training data for machine learning classifier associated with a defined event based on a data augmentation technique associated with data for the respective defined data signatures. For example, in one or more embodiments, the method 1100 additionally or alternatively includes generating training data for a machine learning classifier associated with a defined event by augmenting one or more portions of a defined data signature. Additionally or alternatively, in one or more embodiments, the method 1100 includes training the machine learning classifier based on the training data associated with the one or more augmented portions of the defined data signature.

In one or more embodiments, the method 1100 additionally or alternatively includes augmenting one or more portions of the aggregated multivariate data by combining a first data field of the aggregated multivariate data and a second data field of the aggregated multivariate data in response to a determination that data from the first data field and the second data field satisfy data interaction criterion. Additionally or alternatively, in one or more embodiments, the method 1100 includes storing one or more portions of the augmented aggregated multivariate data in a multivariate time series database.

In one or more embodiments, the method 1100 additionally or alternatively includes modifying one or more portions of the aggregated multivariate data by removing a first data field of the aggregated multivariate data in response to a determination that data from the first data field corresponds to the data from a second data field of the aggregated multivariate data.

In one or more embodiments, the method 1100 additionally or alternatively includes modifying a label for an event from the one or more events to generate a new label for the event via the electronic interface of the computing device.

In one or more embodiments, the method 1100 additionally or alternatively includes, in response to generating the new label for the event and a determination that the new label satisfies a defined criterion with respect to historical labels, transmitting a notification to the electronic interface to indicate likelihood of labeling accuracy.

In one or more embodiments, the method 1100 additionally or alternatively includes retraining one or more machine learning classifiers associated with the respective defined data signatures based on the one or more events.

Figure 12:
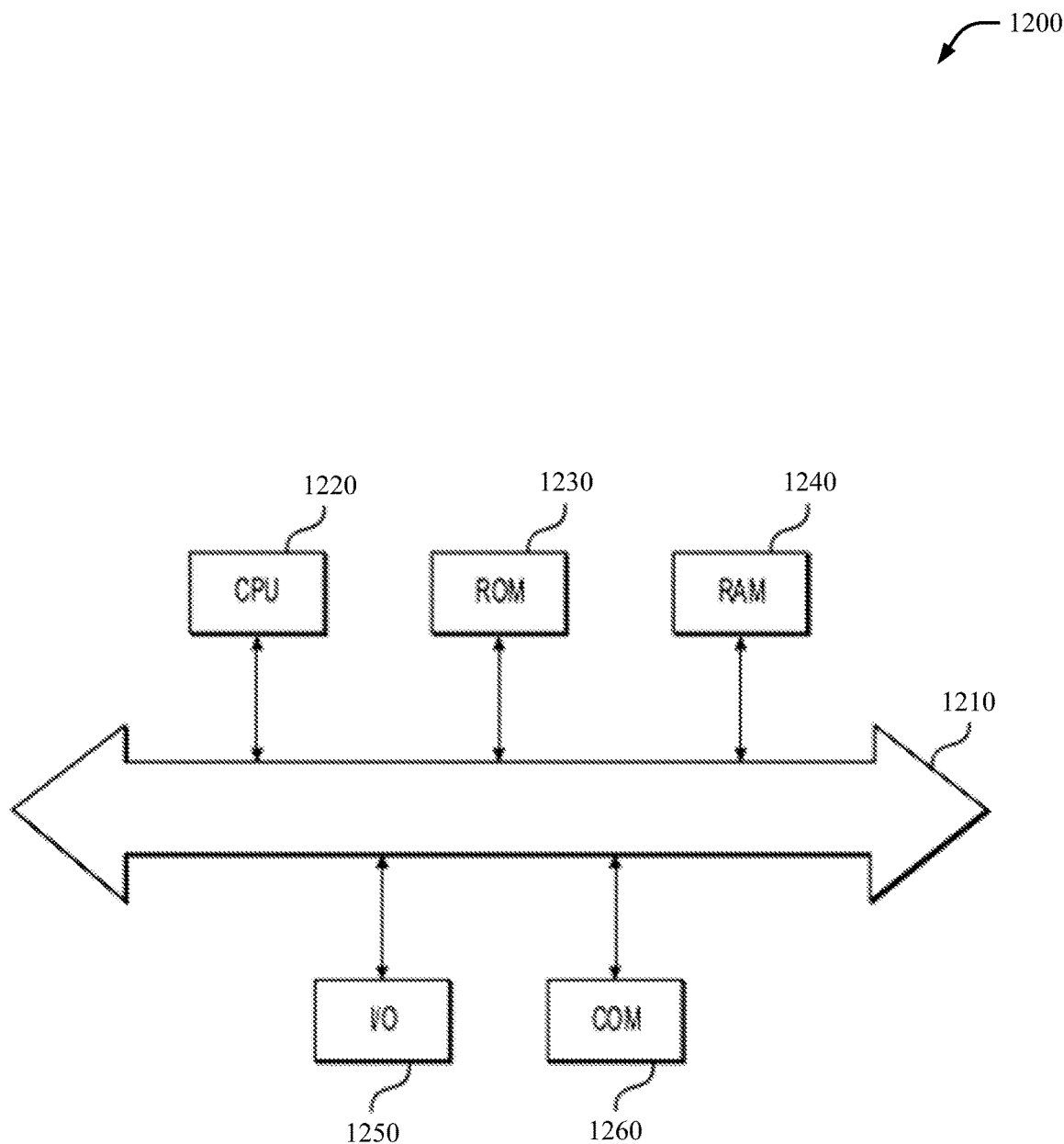
FIG. 12 illustrates a functional block diagram of a computer that may be configured to execute techniques described in accordance with one or more embodiments described herein.

FIG. 12 depicts an example system 1200 that may execute techniques presented herein. FIG. 12 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1260 for packet data communication. The platform also may include a central processing unit ("CPU") 1220, in the form of one or more processors, for executing program instructions. The platform may include an internal communication bus 1210, and the platform also may include a program storage and/or a data storage for various data files to be processed and/or communicated by the platform such as ROM 1230 and RAM 1240, although the system 1200 may receive programming and data via network communications. The system 1200 also may include input and output ports 1250 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
one or more processors;
a memory; and
one or more programs stored in the memory, the one or more programs comprising instructions configured to:
receive a request to classify events associated with one or more assets, the request comprising:
an asset descriptor describing the one or more assets; and
in response to the request:
obtain, based on the asset descriptor, aggregated multivariate data associated with the one or more assets;
perform data augmentation on the aggregated multivariate data to identify one or more rare events, wherein the one or more rare events are referred as a ratio of features to outcomes occurring within a specified time interval in relation to the aggregated multivariate data associated with the one or more assets;
determine a data signature for at least a portion of the aggregated multivariate data that corresponds to sensor output of the one or more assets;
determine, based on respective defined data signatures for respective defined events associated with a defined event attribute, a respective label for one or more events associated with the data signature;
classify one or more events associated with the data signature using one or more machine learning classifiers, wherein the one or more machine learning classifiers are trained on user-labeled historical data and respective defined data signatures for respective defined events associated with a defined event attribute;
render a dashboard visualization to an electronic interface of a computing device, the dashboard visualization comprising data associated with the one or more events; and
control, by the one or more processors, one or more assets using a digital twin visualization of one or more assets via the dashboard visualization based on the classified events.

2. The system of claim 1, the one or more programs further comprising instructions configured to:
determine the respective label based on a comparison between the data signature and the respective defined data signatures.

3. The system of claim 1, the request further comprising a time interval identifier describing an interval of time associated with the aggregated multivariate data, and the one or more programs further comprising instructions configured to:
select the respective defined data signatures based on the time interval identifier.

4. The system of claim 1, the request further comprising a metrics context identifier describing context for metrics associated with the events, and the one or more programs further comprising instructions configured to:

obtain the aggregated multivariate data based on the metrics context identifier.

5. The system of claim 1, the one or more programs further comprising instructions configured to:

receive the request in response to an action initiated via the electronic interface of the computing device.

6. The system of claim 1, the one or more programs further comprising instructions configured to:

receive the request in response to an action initiated via a processing unit associated with the one or more assets.

7. The system of claim 1, the one or more programs further comprising instructions configured to:

augment one or more portions of the aggregated multivariate data by combining a first data field of the aggregated multivariate data and a second data field of the aggregated multivariate data in response to a determination that data from the first data field and the second data field satisfy data interaction criterion; and store one or more portions of the augmented aggregated multivariate data in a multivariate time series database.

8. The system of claim 1, the one or more programs further comprising instructions configured to:

modify one or more portions of the aggregated multivariate data by removing a first data field of the aggregated multivariate data in response to a determination that data from the first data field corresponds to the data from a second data field of the aggregated multivariate data.

9. The system of claim 1, the one or more programs further comprising instructions configured to:

modify a label for an event from the one or more events to generate a new label for the event via the electronic interface of the computing device.

10. The system of claim 9, the one or more programs further comprising instructions configured to:

in response to generating the new label for the event and a determination that the new label satisfies a defined criterion with respect to historical labels, transmit a notification to the electronic interface to indicate likelihood of labeling accuracy.

11. The system of claim 1, the one or more programs further comprising instructions configured to:

retrain one or more machine learning classifiers associated with the respective defined data signatures based on the one or more events.

12. A method, comprising:

at a device with one or more processors and a memory:

receiving a request to classify events associated with one or more assets, the request comprising:

an asset descriptor describing the one or more assets; and in response to the request:

obtaining, based on the asset descriptor, aggregated multivariate data associated with the one or more assets;

performing data augmentation on the aggregated multivariate data to identify one or more rare events, wherein the one or more rare events are referred as a ratio of features to outcomes occurring within a specified time interval in relation to the aggregated multivariate data associated with the one or more assets;

determining a data signature for at least a portion of the aggregated multivariate data that corresponds to sensor output of the one or more assets;

determining, based on respective defined data signatures for respective defined events associated with a defined event attribute, a respective label for one or more events associated with the data signature;

classifying one or more events associated with the data signature using one or more machine learning classifiers, wherein the one or more machine learning classifiers are trained on user-labeled historical data and respective defined data signatures for respective defined events associated with a defined event attribute;

rendering a dashboard visualization to an electronic interface of a computing device, the dashboard visualization comprising data associated with the one or more events; and controlling, by the one or more processors, one or more assets using a digital twin visualization of one or more assets via the dashboard visualization based on the classified events.

13. The method of claim 12, the determining the respective label comprising determining the respective label based on a comparison between the data signature and the respective defined data signatures.

14. The method of claim 12, the request further comprising a time interval identifier describing an interval of time associated with the aggregated multivariate data, and the method further comprising:

selecting the respective defined data signatures based on the time interval identifier.

15. The method of claim 12, the request further comprising a metrics context identifier describing context for metrics associated with the events, and the obtaining the aggregated multivariate data comprising obtaining the aggregated multivariate data based on the metrics context identifier.

16. The method of claim 12, the receiving the request comprising receiving the request in response to an action initiated via the electronic interface of the computing device.

17. The method of claim 12, the receiving the request comprising receiving the request in response to an action initiated via a processing unit associated with the one or more assets.

18. The method of claim 12, further comprising:

augmenting one or more portions of the aggregated multivariate data by combining a first data field of the aggregated multivariate data and a second data field of the aggregated multivariate data in response to a determination that data from the first data field and the second data field satisfy data interaction criterion; and storing one or more portions of the augmented aggregated multivariate data in a multivariate time series database.

19. The method of claim 12, further comprising:

modifying one or more portions of the aggregated multivariate data by removing a first data field of the aggregated multivariate data in response to a determination that data from the first data field corresponds to the data from a second data field of the aggregated multivariate data.

20. A non-transitory computer-readable storage medium comprising one or more programs for execution by one or more processors of a device, the one or more programs including instructions which, when executed by the one or more processors, cause the device to:

receive a request to classify events associated with one or more assets, the request comprising:

an asset descriptor describing the one or more assets; and in response to the request:

obtain, based on the asset descriptor, aggregated multivariate data associated with the one or more assets;

perform data augmentation on the aggregated multivariate data to identify one or more rare events, wherein the one or more rare events are referred as a ratio of features to outcomes occurring within a specified time interval in relation to the aggregated multivariate data associated with the one or more assets;

determine a data signature for at least a portion of the aggregated multivariate data that corresponds to sensor output of the one or more assets;

determine, based on respective defined data signatures for respective defined events associated with a defined event attribute, a respective label for one or more events associated with the data signature;

classify one or more events associated with the data signature using one or more machine learning classifiers, wherein the one or more machine learning classifiers are trained on user-labeled historical data and respective defined data signatures for respective defined events associated with a defined event attribute;

render a dashboard visualization to an electronic interface of a computing device, the dashboard visualization comprising data associated with the one or more events; and control, by the one or more processors, one or more assets using a digital twin visualization of one or more assets via a dashboard visualization based on the classified events.

* * * * *